United States Patent
Schanze et al.

(10) Patent No.: US 7,024,692 B1
(45) Date of Patent: Apr. 4, 2006

(54) NON PRE-AUTHENTICATED KERBEROS LOGON VIA ASYNCHRONOUS MESSAGE MECHANISM

(75) Inventors: Martin Lee Schanze, Mission Viejo, CA (US); Mark Lynn Preston, Lake Forest, CA (US); Roger Andrew Jones, Mission Viejo, CA (US); Poornima Manjunath, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/489,161

(22) Filed: Jan. 21, 2000

(51) Int. Cl.
*G05F 17/00* (2006.01)

(52) U.S. Cl. .................. 726/10; 726/5; 726/3
(58) Field of Classification Search ................ 713/200, 713/201; 726/10, 5, 3
See application file for complete search history.

(56) References Cited

U.S. PATENT DOCUMENTS 5,805,823 A * 9/1998 Seitz .......................... 709/236
6,003,136 A * 12/1999 Schanze ..................... 713/201

OTHER PUBLICATIONS

Design and evaluation of the high performance multi-processor server; Morioka et al; Computer Design: VLSI in Computers and Processors, 1994. ICCD '94. Proceedings., IEEE International Conference on Oct. 10-12, 1994 Page(s):66-69.*

Mitigating Amdahl's law through EPI throttling; Annavaram, M.; Grochowski, E.; Shen, J.; Computer Architecture, 2005. ISCA '05. Proceedings. 32nd International Symposium on Jun. 4-8, 2005 Page(s):298-309.*

Predicting Cache Space Contention in Utility Computing Servers; Yan Solihin; Fei Guo; Seongbeom Kim; Parallel and Distributed Processing Symposium, 2005. Proceedings. 19th IEEE International Apr. 4-8, 2005.*

"The Kerberos Network Authentication Service", J.T. Kohl and D.C. Newman, Sep. 19, 1993.

* cited by examiner

*Primary Examiner*—David Jung
(74) *Attorney, Agent, or Firm*—Alfred W. Kozak; Mark T. Starr; Lise A. Rode

(57) ABSTRACT

A method and system is provided wherein a multiple number of non-preauthenticated clients and non-preauthenticated principals are seeking to logon into a Kerberos domain. Normally, such logon operations would be held-up and stopped until any one single client or principal had completed his logon authorization. However, the present system uses an asynchronous message mechanism by which any single non-preauthenticated client or non-preauthenticated principal can complete his initial logon operation without having to wait for another's authenticating logon operation to be completed. A series of asynchronous message mechanisms are provided in which any single client or principal can complete and finalize the authentication of his logon without having to wait for the completion of other requesting clients and principals seeking to logon and be authenticated.

11 Claims, 21 Drawing Sheets

{ FULL VALUE OF EACH FIELD CAN BE ZERO OR ONE }

| 3 | 7 | 11 | 15 | 19 | 23 | 27 | 31 | 35 | 39 | 43 | 47 | 0 50 |
| 2 | 6 | 10 | 14 | 18 | 22 | 26 | 30 | 34 | 38 | 42 | 46 | 0 49 |
| 1 | 5 | 9 | 13 | 17 | 21 | 25 | 29 | 33 | 37 | 41 | 45 | 0 48 |
| 0 | 4 | 8 | 12 | 16 | 20 | 24 | 28 | 32 | 36 | 40 | 44 | |

NOTES:
1. EACH WORD HAS 48 BITS LABEL ZERO THROUGH FORTY-SEVEN
2. THREE LEADING BITS I.E. 50, 49 AND 48 ARE CONTROL BITS, NOT USED FOR DATA

*Figure 13*

NOTES:
"Pn" – INDICATES A PROCESS
"Cn" – INDICATES A CALL OR RETURN
"Rn" – INDICATES A READ OR WRITE PROCESS

US 7,024,692 B1

NON PRE-AUTHENTICATED KERBEROS LOGON VIA ASYNCHRONOUS MESSAGE MECHANISM

FIELD OF THE INVENTION

This disclosure relates to software mechanisms for authenticating a client or principal of a Kerberos domain.

CROSS-REFERENCES TO RELATED APPLICATIONS

This disclosure is related to the following applications, entitled:
MESSAGE CONTROL SYSTEM FOR MANAGING MESSAGE RESPONSE IN A KERBEROS ENVIRONMENT, U.S. Ser. No. 08/884,413 filed Jun. 22, 1997 now U.S. Pat. No. 6,003,136; and SYNCHRONOUS MESSAGE CONTROL SYSTEM IN A KERBEROS DOMAIN, U.S. Ser. No. 08/948,840 filed Oct. 10, 1997 now U.S. Pat. No. 6,055,639; EXPEDITED MESSAGE CONTROL FOR SYNCHRONOUS RESPONSE IN A KERBEROS DOMAIN, U.S. Ser. No. 09/026,746 filed Feb. 20, 1998 now U.S. Pat. No. 6,178,920; ASYNCHRONOUS MESSAGE SYSTEM FOR MENU-ASSISTED RESOURCE CONTROL PROGRAM, U.S. Ser. No. 08/884,418 filed Jun. 22, 1997 now U.S. Pat. No. 6,009,175; each of which are incorporated herein by reference.

BACKGROUND OF THE INVENTION

In recent years, great emphasis has been provided and applied in regard to ensuring the security of communications in networks of clients and servers. Cryptographic systems have been developed for maintaining privacy of information that is transmitted across various communication channels. One type of cryptographic system often used is designated as a "symmetric crypto-system". These symmetric cryptosystems generally utilize electronic keys and can be somewhat compared to physical security systems. An example of this would be the network where a message holding box has a single locking mechanism which has a single keyhole. Then one key holder can use his key to open the box and place a message in the box and then relock the box. Subsequently then, a second holder (who has an identical copy of the key) then unlocks the box and retrieves the message. Here the term "symmetric" indicates the situation where both Users have "identical keys".

In computer systems which are designated as a "symmetric crypto-system", the system requires that there be (i) an encryption function E; (ii) a decryption function D; and (iii) a shared secret key, K. In this situation, the "K" key is a unique string of data bits which apply to the encryption and decryption functions.

One particular example of the encipherment/decipherment function is the National Bureau of Standards Data Encryption Standard designated as DES. Another example is the Fast Encipherment Algorithm (FEAL). In this situation, in order to transmit a message (M) with privacy, the sender must compute a ciphertext designated "C" on the basis where C equals E (M,K). In this situation, the recipient terminal, upon receipt of the ciphertext C, then computes the message M equal to D (C,K), enabling the recipient terminal to recover the message "M".

Again here, K is the shared secret-key which functions such that a unauthorized terminal who copies the ciphertext C, but who does not know the shared secret key K, will find himself unable to recover the message M. Here, the security is based on maintaining the secrecy of the key K.

In addition to the above-mentioned "symmetric cryptosystems" there are also systems designated as "Asymmetric Crypto-Systems" often designated as Public Key CryptoSystems which provide other ways of encrypting information. They differ from symmetric systems, for example, in the physical sense, such that the message box has one lock, but also has two non-identical keys associated with it. Here, either key can be used to unlock the box to retrieve the message which was locked in the box by the other key. This type of system could be made to operate such that keys must be used in a "particular sequence", such that the box can be locked with one key and only then unlocked with the other key. This asymmetric type crypto-system is often designated as a "RSA" system which refers to the names of authors Rivest, Shamir, Adleman (RSA) in a paper described in pages 120–126 of Vol. 21 of CACM (Communications of the Association for Computing machinery), published in February 1978.

In systems designated as Public Key Electronic CryptoSystems, each operating entity or terminal has a private key "d", which is only known to that particular entity or terminal. There is also a public key, "eN" which is publicly known. Here, once a message is encrypted with a User's public key, it can only be decrypted using that particular User's "private key", d. Conversely, if the message is encrypted with the User's "private key". It can only be decrypted using that User's "public key".

A Kerberos Security System is being used as a developing standard for authenticating network Users and is often used primarily in the UNIX community where it is useful because it functions in a multi-vendor network and does not transmit passwords over the network.

Kerberos operates to authenticate Users, that is to say, it determines if a user is a valid User. It does not provide other security services such as audit trails. Kerberos authentication is based on "passwords" and does not involve physical location or smart cards.

To implement Kerberos in the system, each computer in a network must run Kerberos software. Kerberos works by granting a "ticket" which ticket is honored by all the network computers that are running Kerberos protocol. The tickets are encrypted, so passwords never go over the network in "clear text" and the Users do not need to enter their password when accessing a different computer.

Since there is often a need to run Kerberos on every single computer in a network, this sometimes presents a problem for potential Users. Considerable effort and time may be involved in porting Kerberos to each different hardware platform in the network. Kerberos Users tended to be large networks which were furnished with extended expertise. Since such resources are not generally available to smaller networks, it is sometimes a problem to make it available to such smaller networks which cannot justify the cost and expense.

The primary benefit of Kerberos is that it prevents a password from being transmitted over the network.

Kerberos networks are involved with the type of systems designated as "symmetric crypto-systems" discussed above. One type of symmetric crypto system is called the "Kerberos Authentication System". This type of system was discussed and published on the Internet by J. T. Kohl and D. C. Neuman in an article entitled "The Kerberos Network Authentication Service" which was published Sep. 19, 1993 on the Internet RFC 1510. Kerberos uses symmetric key crypto-systems as a primitive and often uses the Data Encryption Standard (DES) as a inter-operability standard. Kerberos systems have been adopted as the basis for security service by the Open Software Foundations (OSF), Distributed Computing Environment (DCE). Kerberos was designed to provide authentication and key-exchange, but was not particularly designed to provide digital signatures.

Thus, networks require systems and methods for securing communications which provide a way for one User to authenticate itself to another User and additionally, these often require systems for securing communications which facilitate digital signatures being placed on a message to provide for non-repudiation.

Kerberized environments involve the transmittal of messages, for example, from a server to a client which leads to several major problems in these networks. One problem involves the inordinate period of time that a client or a server is required to wait after requesting a response to a Kerberos command. As a result of waiting for a response, this causes the controlling software program or process, to wait so that any other clients or servers in the network requesting a service would also have to wait.

Another type of problem involved in Kerberos networks is that there is no existing method of returning unsolicited messages, generated synchronously or asynchronously from a Kerberos Server to a client or other server.

The presently described system involves client authentication and validation communications which are passed or funneled through several software processes, such as system libraries. The problem often arises that if the authentication mechanism is only able to process a single request for authentication to completion, then there would generally exist a waiting time or bottleneck while the processing requests are validated. Thus, by using an asynchronous message mechanism with various subtasks, these subtasks in various states can continue to be processed without waiting for a single request to be completely finished. This facilitates the processing of multiple requests from multiple clients who are requesting Kerberos authentication.

Thus, the software method and system of the described mechanism indicates how the mechanism can authenticate a client or principal who is participating in a Kerberos domain using an asynchronous message process. The validation of the client's ability to participate is performed by a Kerberos server. The communications between the client and the server are performed by passing special types of messages using specialized protocols and the communications are facilitated by a message handling and processing model which employs the asynchronous capability.

Thus, the present system and method provides a new arrangement where clients can be authenticated by a software process residing in a client server unit wherein there previously was no method for client authentication in a Kerberos domain via an asynchronous message process.

SUMMARY OF THE INVENTION

The present configuration provides a system and method involving the logon of non-preauthenticated clients which use a Kerberos domain. A multiple number of clients and principals are connected through a network cloud to a Kerberos Server and also to a client server (Clearpath NX server). The Kerberos Server provides for the administration of Kerberos operations and also provides a Key Distribution Center. The client server utilizes a combination of elements which include a Kerberos Support Library, a General Security Service unit and Master Control Program which utilize a Menu-Assisted Resource Control Program and a Communication Management System (COMS) which cooperate to provide credentials or find credentials for each non-preauthenticated client in order that the client may logon to the system in order to utilize the Kerberos domain.

The authentication of the client or principal who participates in a given Kerberos domain is authenticated by an asynchronous response message after validation of the client's ability to participate is performed by the Kerberos Server. Communications between client and server are performed by passing various classes of messages using various protocols which work on an asynchronous basis.

It should be understood that if the authentication mechanism was only able to process a single request for authentication to completion, then there would exist a number of bottlenecks, since one request for authentication could hold-up many of the other requests for authentication. Thus, by using an asynchronous message mechanism with its sub-tasks, then various authentication cycles can operate and occur without having to wait for any one single request to be completely finished. As a result, there is an enhancement and facilitation of the processing of multiple requests from multiple clients who request Kerberos authentication.

The methodology of the present invention enables asynchronous authentication of a non-preauthenticated single client in a Kerberos domain which services multiple clients, many of whom are requesting authentication. Further, the method eliminates any hang-ups or hold-ups due to unfinished cycles occurring from other multiple concurrent authentication requests.

BRIEF DESCRIPTION OF THE DRAWINGS

FIG. 9 shows the message array full word format for the ClearPath NX Server where FIG. 9B shows the MCS message format, while

FIG. 13 is an illustration of the message array format for the type of Message Control Systems involving "asynchronous" response operations;

GLOSSARY OF TERMS

Figure 1:
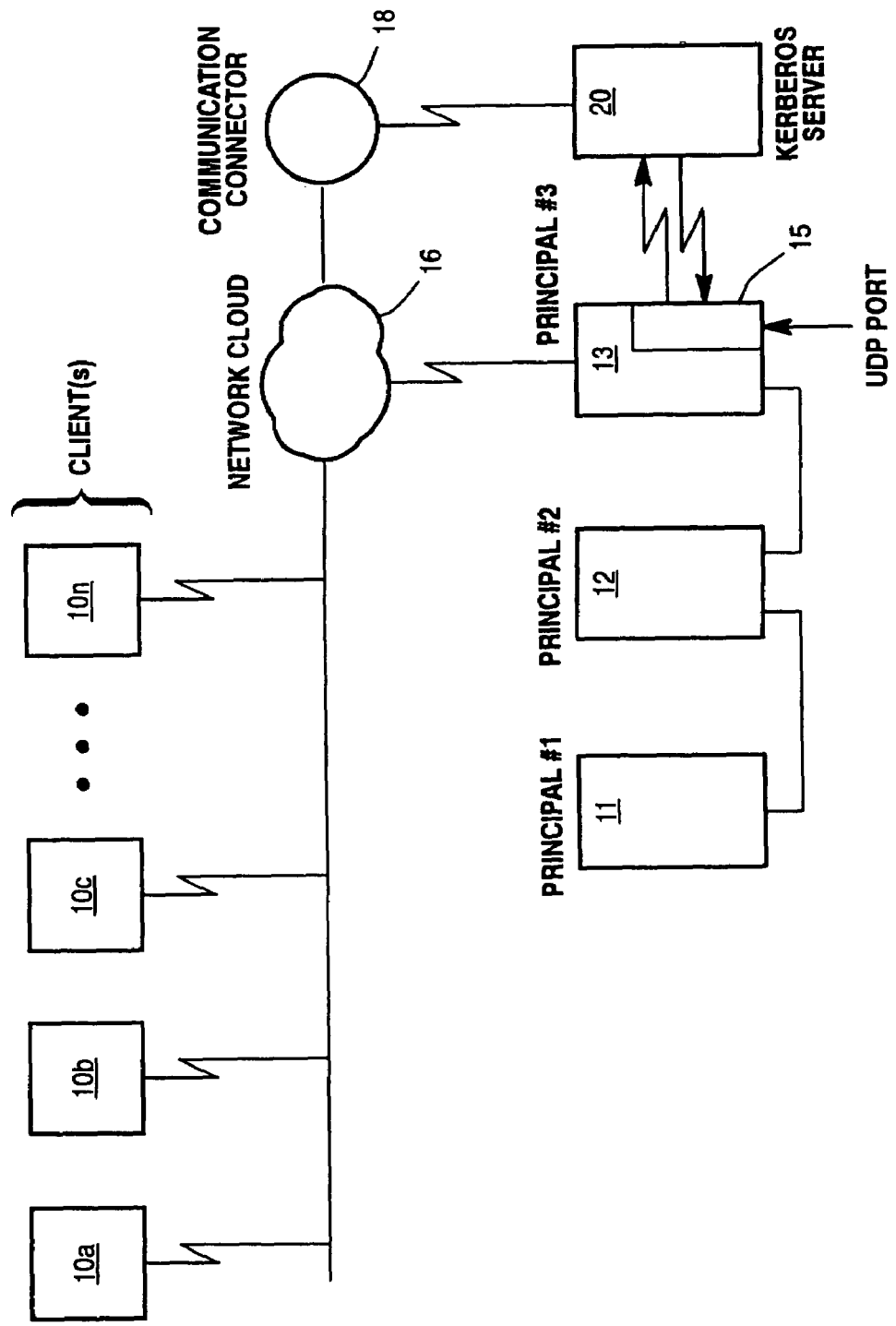
FIG. 1 is a general overview of the Kerberos domain involving various clients and servers in a network.

1. UDP (User Datagram Protocol)—This is a communication protocol which is used as one of a number of "standard" methods of communicating information across a network.

An extension of this is a UDP Port; a communication port which is used for UDP communications.

2. HLCN (Host LAN Connection)—The ClearPath NX HLCN product provides the implementation of NetBIOS and IPX protocols that permit terminal services to the ClearPath NX Server over Netware.

3. MCS (Message Control System)—Programs (with special privileges) on ClearPath NX systems that control the flow of messages between terminals, application programs, and the operating system (MCP). Reference Unisys "A Series DCALGOL Programming Reference Manual," May 1989/Form 5014574.380 (Release Mark 3.8.0)

4. COMS—(Communications Management System)—is a Unisys Message control System that supports processing for a network on the Unisys ClearPath NX Server. Reference: Unisys A Series Communications Management System (COMS) Operations Guide. May 1989 1154523.380.

5. MARC (Menu Assisted Resource Control)—The MARC window provides access to the MARC program. One of the functions of the MARC program is to handle network and session control and provide requested information and system messages for COMS. The MARC window (program) is always in operation in COMS. Reference Unisys "A Series Menu-Assisted Resource Control (MARC)" Unisys Operations Guide, February 1992/Form #8600 0404-100. (Release Mark 4.0.0).

6. GSS-API (Generic Security Service)—Application Program Interface)—This is the draft-standard interface application programs use to access available security services generically. The actual security services are provided by underlying mechanisms. Possible implementation choices for mechanisms include, but are not limited to Kerberos, Secure Sockets, DASS. The goal is that applications do not require any knowledge about the underlying mechanism in order to use it. Reference: GSS-API Version 2 on A Series Functional Design Specification 95132/3 version C. Published Jul. 23, 1996 by Unisys Corp.

6a) DASS—A security mechanism using the X.509 capabilities.

6b) Secure sockets—A security mechanism that has growing popularity on the Internet.

7. HLCNTS (Host LAN Connection Terminal Service)—ClearPath NX terminal service product predicated on the underlying HLCN product. HLCNTS Provides connection based communications between clients using Netware based IPX/NetBIOS and the ClearPath NX. Reference: Unisys Host LAN Connection Terminal Services (HLCNTS) 0.1.4/Version D, Jun. 26, 1995.

8. Asynchronous message (Definition #1)—A message (data in display or non-display format) which is generated by a concurrent independent process yet requiring occasional synchronization and cooperation of other processes). (Definition #2):—A message (data in display or non-display format) which was generated in an environment where asynchronism of processes exists. Reference: "*An introduction to operating Systems*" by Harvey M. Deitel (Addison-Wesley Publishing Company) First Edition 1984.

9. Synchronous Message #1—A message (data in display or non-display format) which is generated by a concurrent process dependent upon its own environment. #2—A message (data in display or non-display format) which was generated in an environment where synchronism of a single process exists. Reference: "*An Introduction to Operating Systems*" by Harvey M. Deitel (Addison-Wesley Publishing Company) First Edition 1984.

10. Kerberos Support Library (KSL)—This library provides functions to support the various Kerberos message exchange protocols and a number of User administration functions. It closely interacts with the GSS Library and other system software. Reference: A-EAM Kerberos Support Library—Functional Specification 93187/3 Version C. Published Mar. 6, 1997 by Unisys Corp.

11. Stack Capsulate—A "snapshot" or "outline" of a non-detailed process environment. For explanatory purposes, it is a mid-level overview of the processing environment highlighting events in a sequential order.

12. Dialog No. (Dialog Number)—MARC establishes Dialog(s) Numbers on behalf of a client requesting services. A Dialog Number is the internal/external number associated with a client which is accessing (using) MARC.

13. NX MCP Environment—Unisys Corp. sells computers under the name "ClearPath". For explanatory purposes, the architecture is designated as the ClearPath NX. The ClearPath NX is packaged with both MCP environments (this is the Unisys A Series E mode processor) and the "NT" Server side. The NX MCP Environment pertains specifically to the E mode processor side of the architecture exclusive of the NT Server side.

14. Unsolicited Message—A message (data in display or non-display format) which is generated by a concurrent process that is received by a concurrent independent (different) process.

15. Transaction ID i.e., (TRANSACTION_ID)—The internal name given to a uniquely generated number passed from MARC to the KSL (Kerberos Support Library) identifying a clients service request. This number will then be attached by the KSL and in turn sent back to MARC such that MARC may route an asynchronous message back to the appropriate client (originator).

16. Networking Host Software—Generalized term for software residing and functioning on the ClearPath NX which provides network communication capability. Software such as the Networking Support Library, Telnet, TCP/IP, HLCN, etc. would be "known" or "thought of" as Networking Host Software.

17. IPX—A communications protocol "Internetwork Packet Exchange".

18. COMS MSG Format—A message consistent with an agreed upon format that COMS (Item #4 of Glossary) recognizes. A message containing a COMS header (information in an agreed upon location and format) and the message portion so that COMS may route the message.

19. Key Distribution Center—Portion of the software residing on the Kerberos Server which processes tasks related to Key(s). A key is a signal code which can be used to access a message which would not ordinarily be accessible.

20. K-Admin—Kerberos Administration/Software on the Kerberos Server responsible for configuration and User administration of the Kerberos Server.

21. DCWRITE—A function construct in DCALGOL used to construct messages and pass messages to an MCS. (Item #3) Reference: A Series DCALGOL Programming Reference Manual form #5014574.380 (May 1989) Page 3–13 and Section 5. Published by Unisys Corporation.

22. NetWare—An operating system developed by Novell, Inc. The Netware operating system runs in a file server and controls system resources and information processing on the entire network or Internetwork. Reference: "*Concepts*" Novell Netware 3.12, July 1993. Part Number 100-001715-001.

23. Station Transfer—ClearPath NX terminal service product predicated on an underlying Station Transfer Protocol. Reference: Unisys "A Series Station Transfer Changes for A-EAM," Functional Design Specification 95145/3 Version A, Nov. 2, 1995.

24. GSS-API Library—ClearPath NX support library providing services as defined in item #6 above.

25. UserData—constitutes a miniature data management system that maintains a database called SYSTEM/USERDATAFILE. The database defines valid Usercodes and contains various types of data concerning the User population on a particular ClearPath NX Server.

26. Encryption Library—The DES (Data Encryption Standard) Support Library. The DES Encryption Support Library provides the various encryption algorithms which are needed by the Kerberos protocols. According to [RFC1510] any Kerberos implementation must, at a minimum, support the following encryption algorithm:—DES/CBC/MD5 (DES encryption, using cipher block chaining mode with an MD5 checksum).

27. Directives interface—A Directive Command is a feature of MARC which enables a system to create new commands and make them available to MARC Users. To implement a 'true' directive, the function of these commands is defined by writing a library of ALGOL procedures (within the KSL in this case). The DIRECTIVE command is used in MARC to associate a command name with the procedure. Thereafter, Users can use the new command in the same way as they use any other MARC command. Reference Unisys "*A-EAM Kerberos Directive Commands,*" Functional Design, 95057/3 Version B, Aug. 17, 1995.

28. Master Control Program (MCP)—Unisys reference to "*Burroughs Large Systems MCP Manual*"—Release 3.5; May, 1985/Copyright 1985, Burroughs Corporation, Detroit, Mich. 48232.

29. Event—An "Event" provides a means to synchronize simultaneously executing processes. An event can be used either to indicate the completion of an activity (this would be how Kerberos is using it, i.e., on the Kerberos Server; and EVENT is changed to a "Happened" state and the KSL is made aware of this change, (in this case the response has been formed) or as an interlock between participating programs over the use of a shared resource. From Unisys "*A Series ALGOL Programming Reference Manual Volume 1: Basic Implementation*" Release Mark 3.7/July, 1987; Form# 1169844.

30. Credential Handle—A data structure that points to a unique instance of a credential.

31. Kerberos Authentication—A standard protocol that verifies the identity of a client to a server. The verification occurs by the client obtaining credentials from a Ticket-Granting Server. These credentials provide proof of the client's identity to the server.

32. Preauthentication—A client has obtained credentials before connecting to a server.

33. Non-preauthentication—A client connects to a server without having obtained credentials beforehand.

34. Principal—A client, server or service.

35. Principal ID—A unique identifier used to name principals.

36. Ticket-Granting Server—A trusted third-party server that authenticates clients and issue credentials that clients use to authenticate themselves to servers.

37. Credentials—A data structure issued by a trusted third party that uniquely identifies a client to a server. This data structure is encrypted such that only the server can decrypt it. Successful decryption of this data structure by the server verifies the identity of the client, since only the true client could have obtained the credential from the Ticket-Granting Server.

38. GSS-cred-handle—A credential handle. A GSS handle is of type DOUBLE and is represented by two words. The first word of the handle has three components containing important pieces of information about the handle. The second word is unused. The three key components of a handle are its type, index and qualifier. The type of a handle can have three possible values, name-handle, and credential handle or a context handle. This is stored in bits 43 through 40 of the first word. The index of a handle represents the index in the GSS internal data set. This is stored in bits 39 through 20 of the first word. The qualifier represents a random number that makes the handle unique. This random number is generated while creating the handle. This is stored in bits 19 through 0 of the first word.

39. GSS-cred-tag—The GSS-cred-tag is the unique key by which GSS references the credential efficiently.

40. Mech_Add_Cred—This is a GSS procedure that KSL calls to add a credential for the name-handle that is passed in. A new credential handle is created by GSS and passed back to KSL.

41. MCP_ADD_Credential—This is a GSS procedure that is called by the MCP when a new session is logged on. The MCP is handed a credential or context handle that is associated with the mix number that was passed in.

42. Name-Handle—A Name-Handle is a handle representing a name that GSS knows about. The type field of this handle has the value for the name-handle, the index represents its index in the GSS internal tables and the qualifier makes the handle unique.

43. Telnet—A standardized protocol that logically connects a terminal or terminal emulator running in a workstation to a server. After successfully connecting to the server, the client may directly issue commands to the server that the server interprets and responds to.

44. Station Transfer—A Unisys proprietary protocol that logically connects a terminal or terminal emulator to remote Unisys A Series or ClearPath system.

45. ASP-Handle_Internal ID is a GSS-API procedure that returns the local usercode associated with the handle that is passed in. Any type of handle—name handle, credential handle or context handle, can be passed in, as input to the procedure. MARC calls this procedure passing in a credential handle and gets back the A-Series usercode to log the user onto the system.

46. Intercomq—an array of message(s) which is shared by one or more processes or programs This "queue" would be managed by an external third party such as an MCS (and ultimately the MCP). Processes or programs sharing this array of messages would be able to "communicate" via this queue, i.e., "Intercomq."

47. Queue Event Mechanism—A software module designed to produce various results based on the success or failure of a message or command being INSERTed into a queue. The result would be in the form of an EVENT which could be interrogated and would be found to have HAPPENED or NOT_HAPPENED.

48. MCS Logger Describes a "function" or "set of functions" whereby activities associated with an MCS (Message Control System) are logged in the system SUMLOG residing on some readable/writeable media on the ClearPath NX Server. Examples of what would be logged in the System SUMLOG are tasks initiated or terminated under or through an MCSA, changes in status of tasks would also be logged. For a complete evaluation, see the *Unisys A Series System Software Support Reference Manual* Version Mark 3.7, July 1987 #1170016.

49. Mix Number—A "Mix Number" is a number assigned by the ClearPath NX Server which identifies a task, process, or library numerically such that task/process administration, resource allocation, etc. may be performed by the MCP (Operating System).

50. DCSENDMESSAGETOMCS—The name of a procedure which is exported from the MCP and is available as "re-enterent code" to the Kerberos Support Library. The function of this procedure is to transport or "send" a message from the Kerberos Library to a specified MCS. For this implementation the MCS is COMS. This process occurs via an asynchronous mechanism.

GLOSSARY

Kerberos Security Administrative Commands

1. All commands are entered by the client with the Kerberos prefix of "KRB".

2. Commands:
  (a) CLOCKSKEW: This command allows the ClearPath NX security administrator to set the allowable clockskew used by the Kerberos protocol to accommodate variations in clocks on remote systems, when verifying a ticket. The default clock-skew value is 300 seconds. (Synchronous).
  (b) DEBUG: The DEBUG command does not require special privilege for a user to inquire on the DEBUG option that is currently being set. DEBUG is used to obtain information about KADMIN requests), procedure entries and exits, etc. This is used as a diagnostic tool. (Synchronous).
  (c) DESTROY: When invoked the command writes zeros to the specified credentials cache containing the tickets and thereby destroying the tickets. The cache is removed. (Synchronous).
  (d) INIT: Before Kerberos can grant tickets for access to the services of other principals in a network, the user must first log in to Kerberos to obtain a set of credentials consisting of a Ticket Granting Ticket (TGT) and a session key (provided the User has not already logged on to Kerberos and had the TGT forwarded to the ClearPath NX Server). On the ClearPath NX Server, the KRB INIT command provides the means for allowing a User to log into Kerberos to obtain the TGT. (Asynchronous).
  (e) KeyTab: This command allows an appropriately privileged User to inquire the application principals in the Key Table file on the ClearPath NX Server, but not the values of the keys associated with the application principals. (Synchronous).
  (f) LIST: Displays for a User the primary principal and Kerberos tickets held in the credentials cache. (Synchronous).
  (g) LOAD: Allows an appropriately privileged User to load new configuration files into memory immediately or wait until the next Kerberos initialization. (By default files are loaded at initialization). (Synchronous).
  (h) PASSWORD: Allows the client to change his or her password. (Asynchronous).
  (i) PID: Permits the client to inquire on his or her own Principal_ID given his/her ClearPath NX Usercode. (Asynchronous).
  (j) REALM: Returns the realm name for the local host. (Synchronous).
  (l) REPLAY: Allows the appropriately privileged User to inquire, enable, or disable the REPLAY detection option. (Synchronous).

Figure 8:
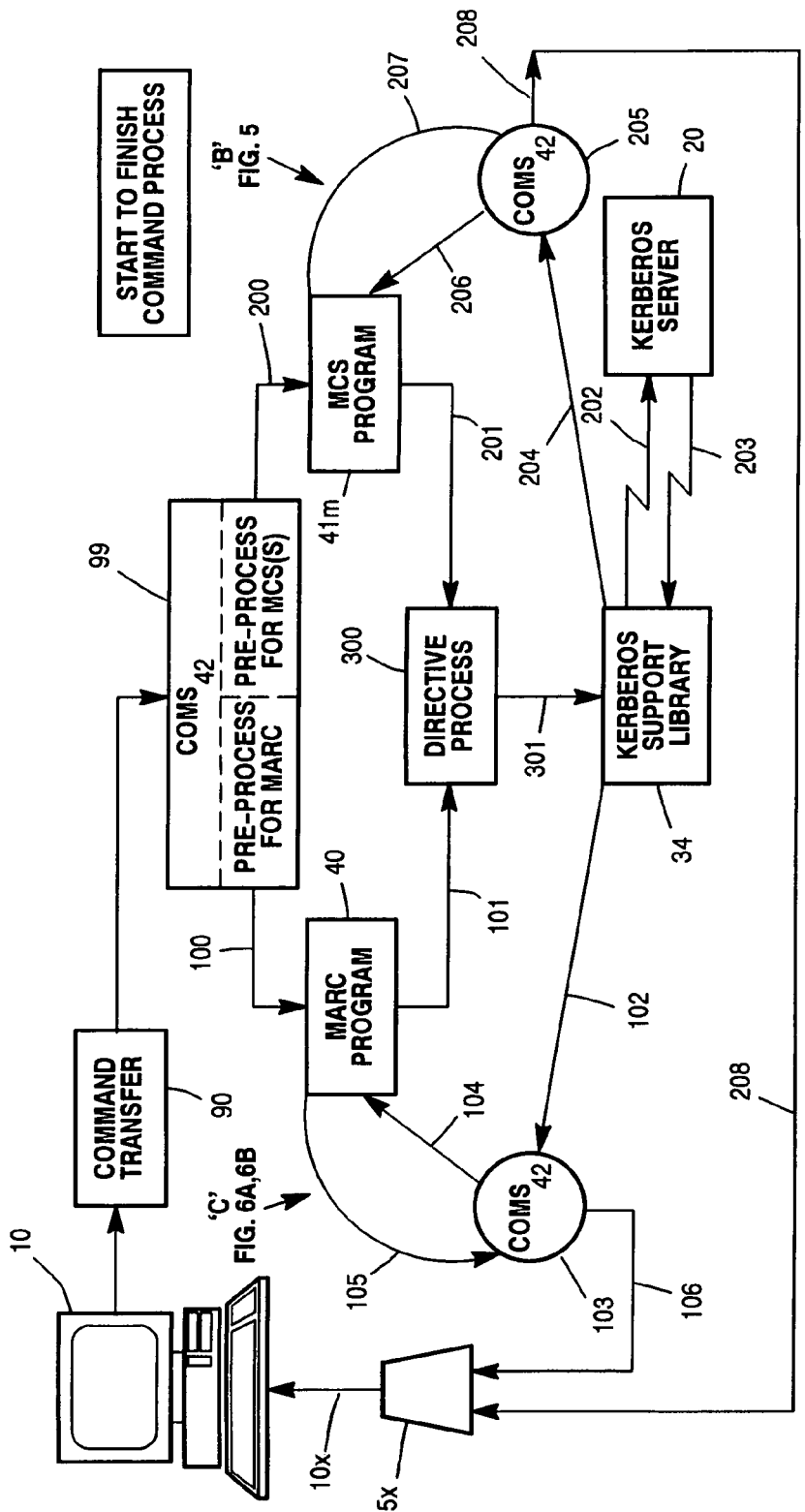
FIG. 8 is a generalized overview of various channels for synchronous and asynchronous message response management.

General Overview:

A general overview of various aspects of the Kerberos domain messaging systems is shown in FIG. 8. This figure illustrates various sequences used for both synchronous message handling and for asynchronous message handling. Discussion of "asynchronous" operations is provided to show the contrast to the presently described "synchronous" operations.

As seen in FIG. 8, the client 10 initiates a command transfer 90 to the COMS program 99 (Communications management System Program). Here the COMS program partitions into two aspects, one of which is the pre-processing for the Menu Assisted Resource Control Program (MARC) and the pre-processing for the Message Control Systems Programs.

One leg at marker 100 shows the use of the Menu Assisted Resource Control Program 40, while the other leg 200 shows the use of the message control system program 41*m*.

Now, following the leg 100 marker, the MARC program 40 is invoked which program initiates via Marker 101, the directives processes 300. The directives processes 300 is a software mechanism in MARC to identify and process a "directive command".

The directives process then operates at marker 301 to contact the Kerberos Support Library 34. Now assuming that the system is operating on a synchronous message basis, the Kerberos Support Library 34 will operate at marker 202 requesting service on behalf of the MARC program 40.

During this service request all previous process within this environment will wait for the service response from the Kerberos Server 20. Following marker 203 back to the Kerberos Support Library 34 the response is returned. The Kerberos Support Library 34 will operate at marker 102 to send the Kerberos response to the COMS program 103, which then at marker 104, will contact the MARC program 40 which will then use the marker 105 to reconnect to the COMS program 103 with the processed message response which at marker 106 will be conveyed to the multiplexer 5x, and thence at marker 10x conveyed back to the client 10.

Now on the other hand, if this had been an "asynchronous" message response, it would follow that the directives process 300 would at marker 301 connect to the Kerberos Support Library 34 which then, at marker 202, would contact the Kerberos Server 20 which would then respond at marker 203 back to the Kerberos Support Library 34. As an asynchronous process during the transfer of control at marker 202 to the Kerberos Server 20 all previous process in the process environment are notified, specifically the MARC program 40 via marker 102 through COMS 103 via marker 104 that the response to its service request will be returned at a later time. Continuing with the original request the Kerberos Server 20 now having generated the response passes the response via marker 203 to the Kerberos Support Library 34. The Kerberos Support Library 34 would then at marker 102, connect to the COMS program 103 which program would, at marker 104, connect to the MARC program 40, which would then at marker 105, communicate back to the COMS program 103 which then at marker 106 would convey the message response to multiplexer 5x, which would then, using marker 10x, convey the Kerberos Message Response to the client 10.

Now, looking on the Message Control Systems (MCS) operations originating from the COMS program at marker 99, it will be seen that at marker 200 the pre-processing will initiate the MCS program 41m, which then at marker 201 will connect to the directives process 300.

The directives process operates at marker 301 to contact the Kerberos Support Library 34.

Now assuming that the command is a "synchronous command", then the Kerberos Support Library will operate at marker 202 requesting service on behalf of the MARC program 40. During this service request all previous process within this environment will wait for the service response from the Kerberos Server 20. Following marker 203 back to the Kerberos Support Library 34, the response is returned. The Kerberos Support Library 34 will operate at marker 204 to send the Kerberos response over to the COMS program 205, which then at marker 208 will convey the Kerberos message response to the multiplexer 5x, which at marker 10x will convey the synchronous message response back to the client 10.

On the other hand, if the command involved were a "asynchronous command", then the MCS program 41m would connect at marker 201 to the directives processes 300, which at marker 301 would contact the Kerberos Support Library 34. As an asynchronous process during the transfer of control at marker 202 to the Kerberos Server 20, all previous processes in the process environment are notified (specifically the MCS program 41m via marker 204 through COMS 205 via marker 206) that the response to its service request will be returned at a later time. Continuing with the original request the Kerberos Server 20 now having generated the response, passes the response via marker 203 to the Kerberos Support Library 34.

Thence, using the asynchronous command situation, the Kerberos Support Library 34 would operate at marker 204 over to communicate with the COMS program 205, which then at marker 206, would contact the MCS program 41m. Thence, the MCS program at marker 207 would reconnect to the COMS program 205 which then would at marker 208, connect to the multiplexer 5x in order to return the asynchronous message command at marker 10x back to the client 10.

At the bottom of FIG. 8 there is seen a number of notations and references to certain of the markers in FIG. 8. Thus, the marker 301 represents a Kerberos command to be responded to by either the Kerberos Support Library 34, or the Kerberos Server 20. The marker 102 represents the command response for the MARC message layout.

Figure 2:
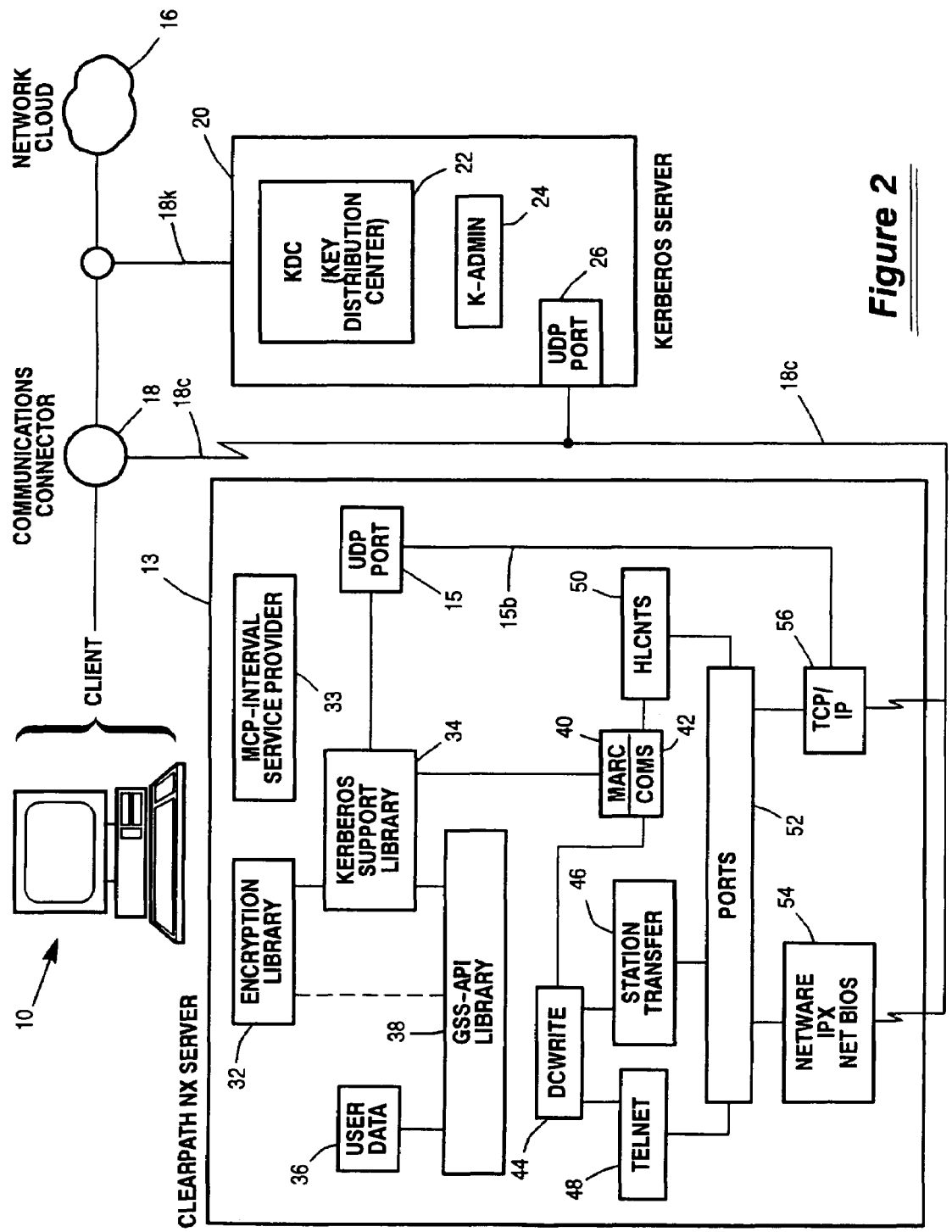
FIG. 2 is a block diagram showing the elements involved in network relationship designated as client/ClearPath/Kerberos Server.
Figure 9A:
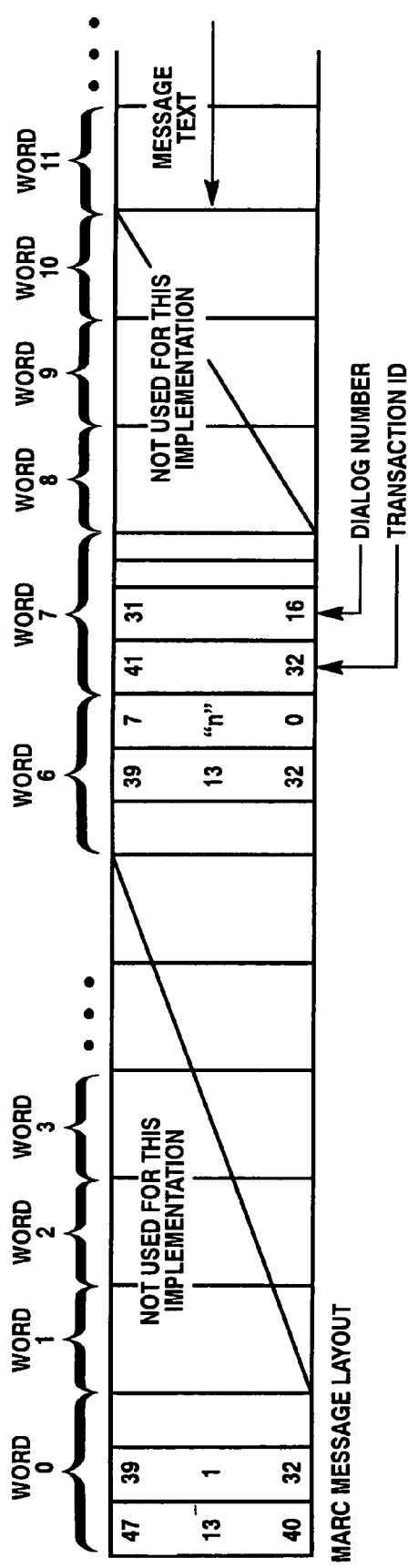
FIG. 9A shows the MARC message format.
Figure 9B:
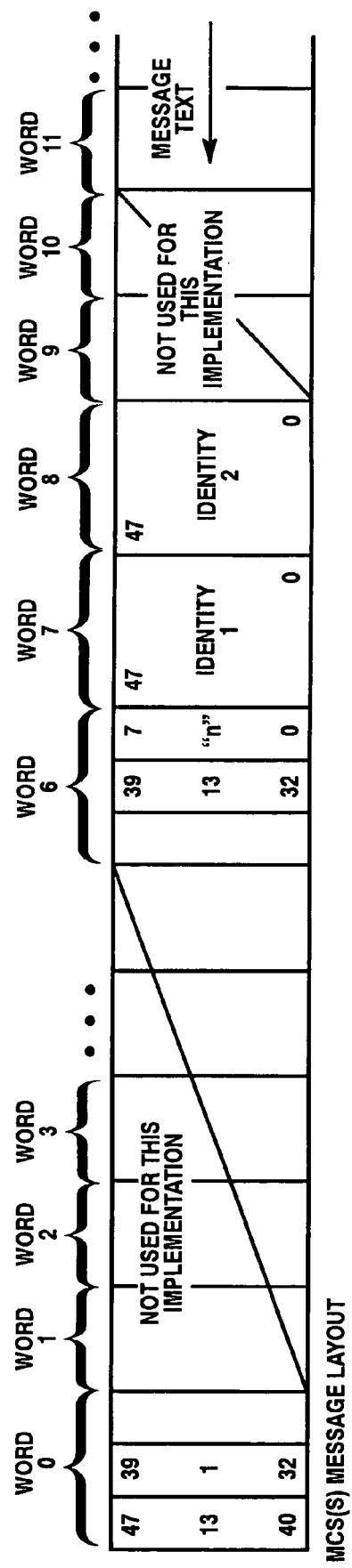
Figure 9C:
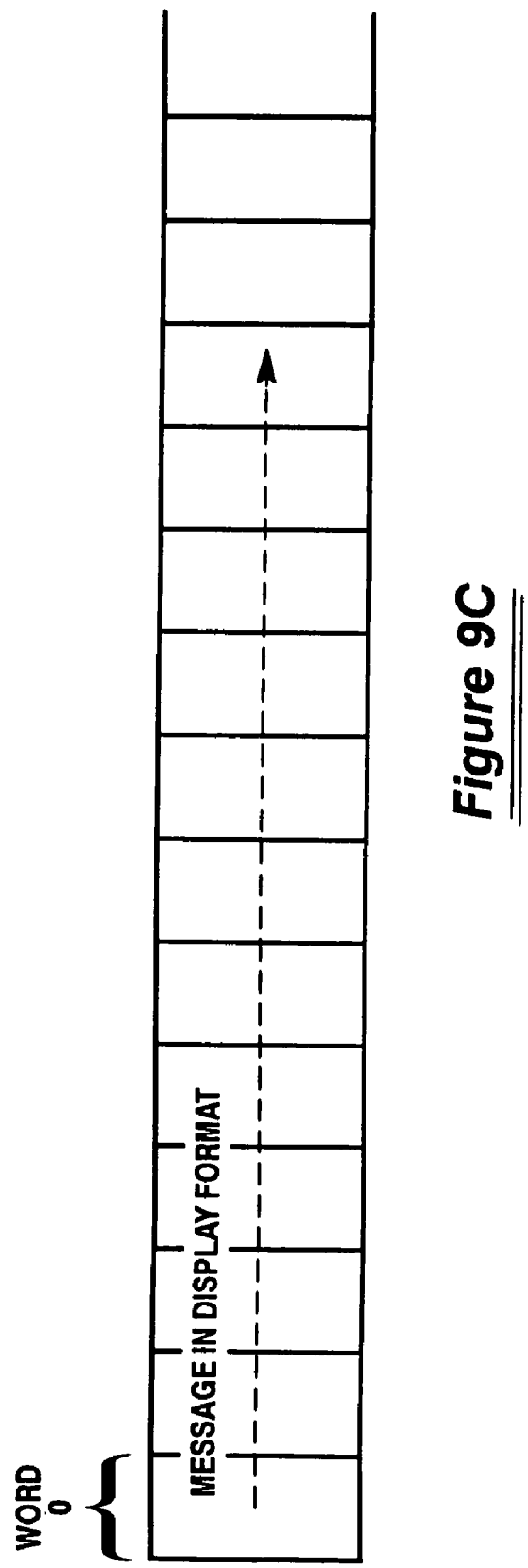
FIG. 9C illustrates the display message format.

FIG. 9 (9A, B, C) is an illustration of the full word format for the ClearPath NX Server, 13 of FIG. 2.

Figure 6A:
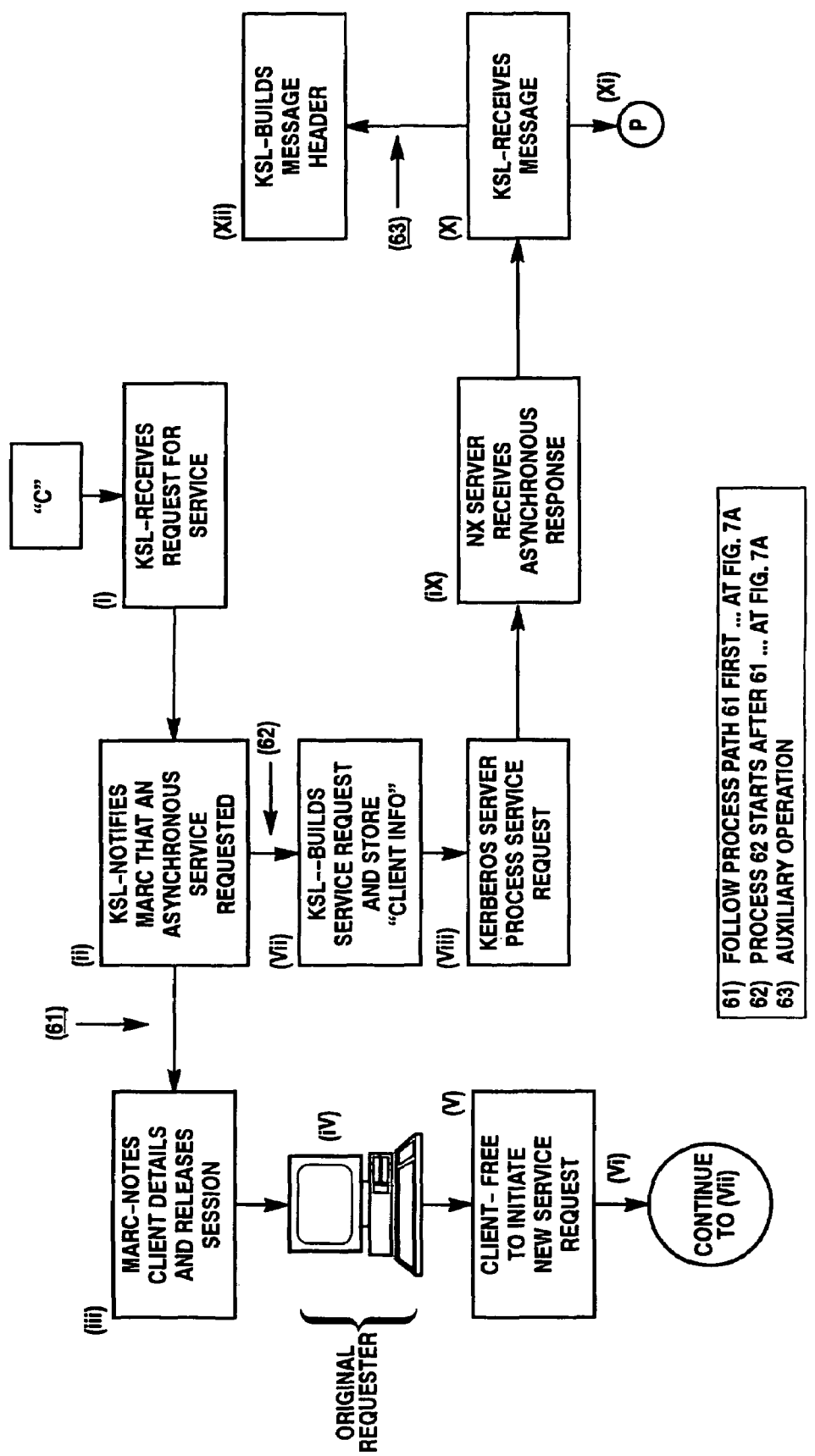
FIG. 6 is a flow chart illustrating the Menu Assisted Resource Control Program process involved for asynchronous message handling as shown in FIGS. 6A and 6B.
Figure 6B:
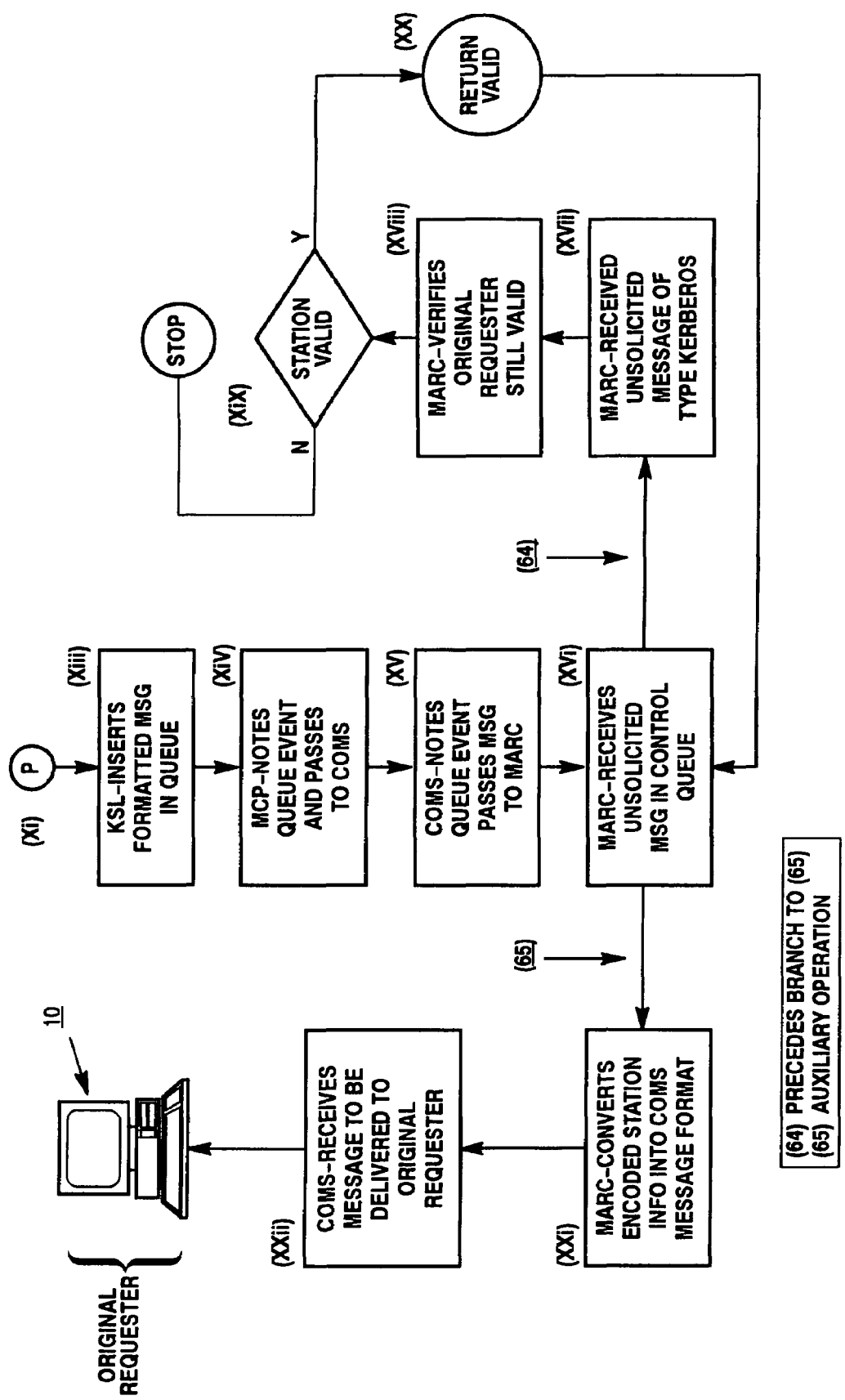

Referring to FIG. 8, it may be noted that the marker 105 is related to the sequences of FIGS. 6A and 6B which refer to the handling of asynchronous service requests from the MARC program.

Figure 4:
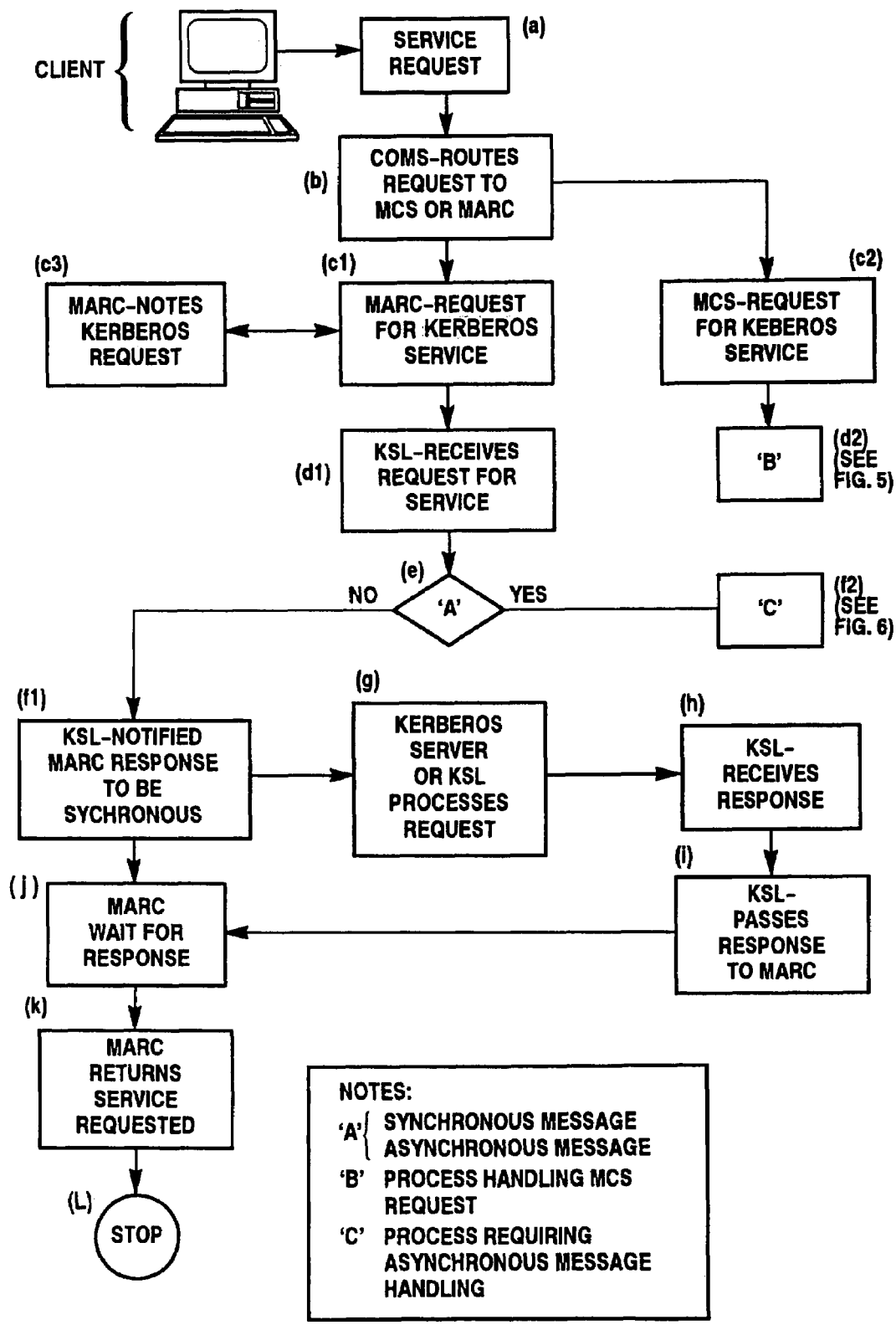
FIG. 4 is a flow chart illustrating the steps involved when a client service request seeks a response from the Kerberos server and indicating the path steps (f1) through (k) for synchronous message response.
Figure 5:
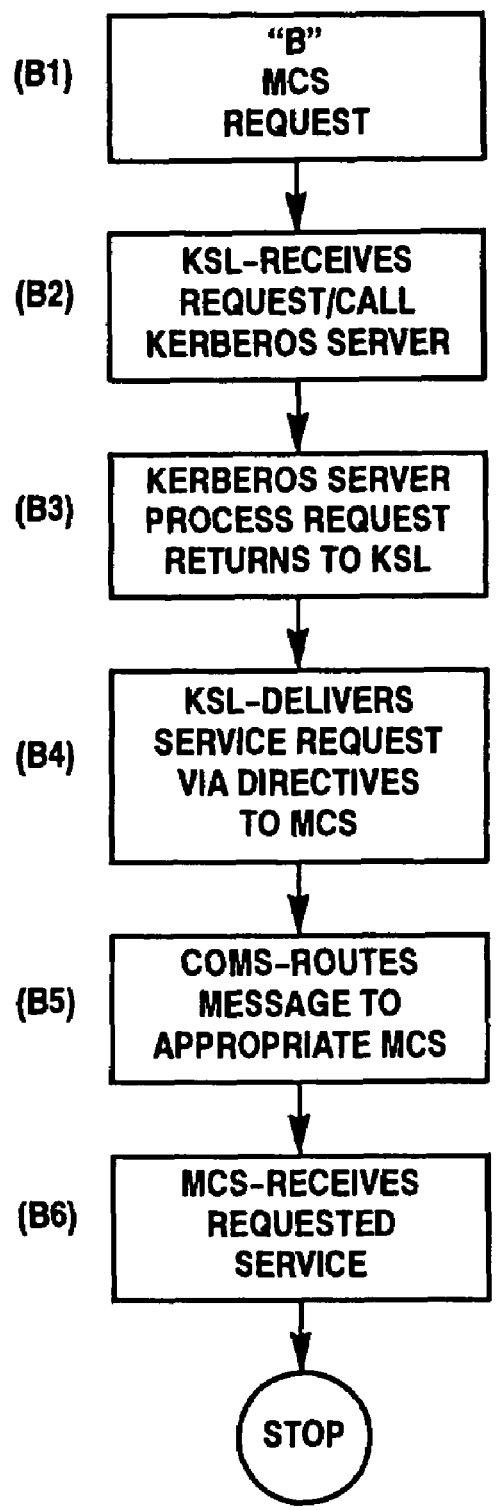
FIG. 5 is a flow chart illustrating the steps involved when the request involves a program designated as message communication system MCS.

Then again in FIG. 8, at the marker 207, this can be correlated to FIG. 5 (which is derived from FIG. 4) and which involves the processes for handling the message control system request operations.

If the message control system MCS used is that of MARC 40, this particular system uses a Transaction_ID. In this case, the routing of an asynchronous response message is done by COMS 42 through the MARC 40 program as is indicated in FIGS. 6A, 6B for the sequence "C", of FIG. 4.

On the other hand, the response message 104 may be routed in a separate channel shown in FIG. 8 through the COMS 42 over to the other MCS 41m and the queue 62 as indicated in FIG. 5 at the sequence "B".

The channel for other types of Message Control Systems (MCS) will use the COMS program 42 and use an MCS number instead of the Transaction_ID.

Figure 10:
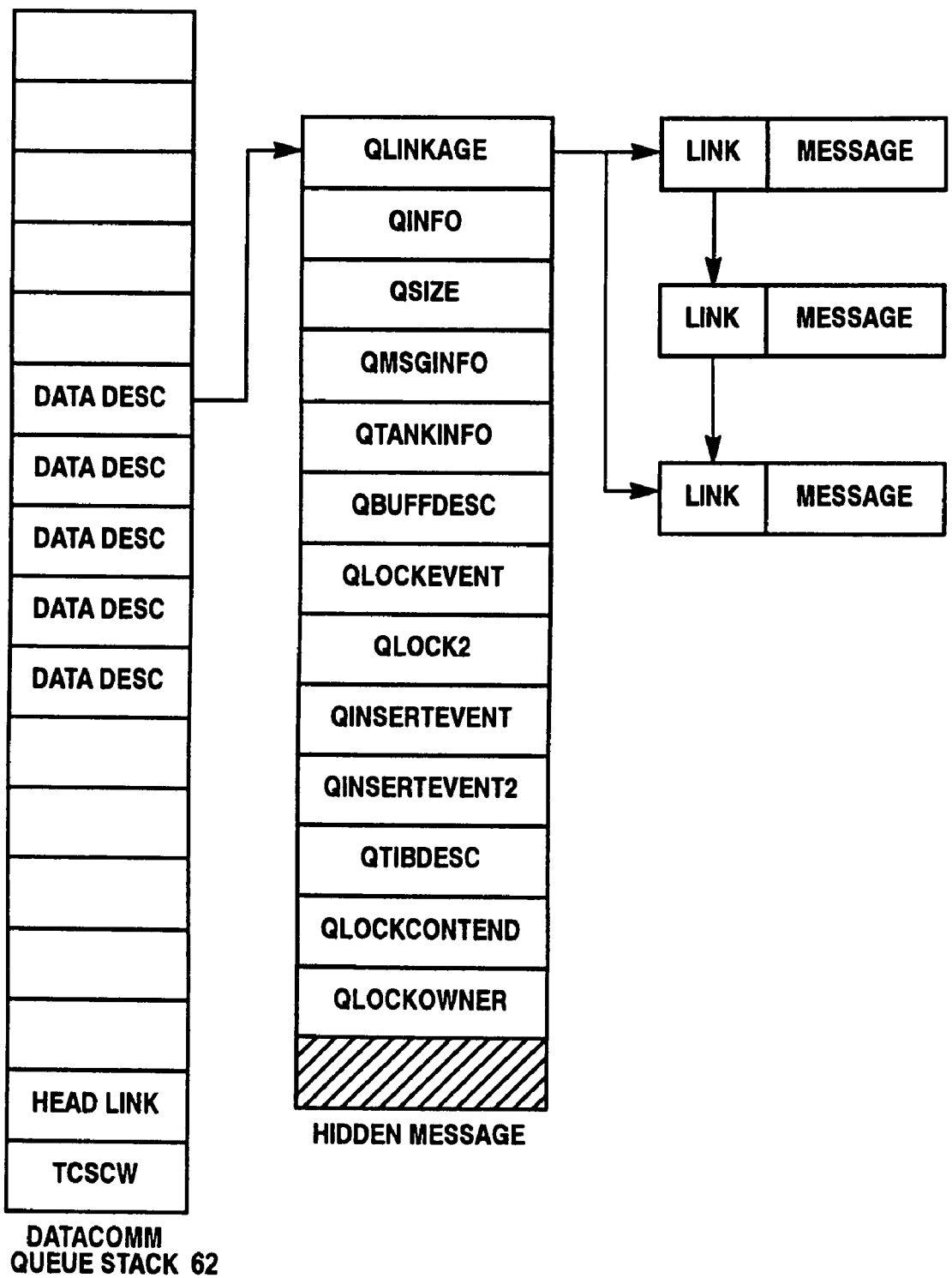
FIG. 10 is a schematic drawing of the Datacomm Queue Stack arrangement showing a linked list of available queue locations handled by the ClearPath NX Server.

The MCS 41m has a program with a queue 62 defined with stacks shown in FIG. 10. The MCS channel does not generally have to worry about routing of the message, since there is generally a single User for that MCS program, while on the other hand, the MARC program may have a thousand Users and this requires a unique Transaction_ID. The MCS system and channel (B of FIG. 5) is considerably more versatile in that it could use several words, or could use neither of these and just use an MCS number. Additionally, the MCS channel could make use of all of the extra words or even more words if required in order to handle the possibility of thousands of client users.

Thus, there are variety of channels for providing asynchronous response messages back to a client requester as seen by the above examples where the MARC program uses the Transaction_ID while on the other hand, the Kerberos response message may be handled on the other MCS system via COMS 42 using one word or multiple words or a combination of greater number of words to route a message to particular client Users.

When non-asynchronous (synchronous) response messages are involved, the "synchronous" response messages are normally routed as shown in FIG. 4 through steps a, b, c1, d1, e, f1, g, h, i, j, k, and L. However, certain response improvement will be indicated in connection With FIGS. 12 and 14 subsequently described.

The present system and method involves the Kerberos realm or domain which denotes a number of hosts, servers and clients connected into a single administrative domain.

The general concept for modules which are hosts, servers or clients are often designated herein as "principals". The term "principal" is a term used to denote a uniquely named client or server participating in a network environment. The Kerberos realm or domain is provided with a Kerberos Server which is a host-server responsible for Kerberos security. Clients are units which may reside in attachment to the network cloud or within the network cloud. The use of the term "cloud" or the term "network cloud" is a term often proposed by the Novell Corporation and used to designate interconnections in a network.

The term "ClearPath" is used to denote a Unisys Corporation system network wherein different platforms may be connected together but are also provided with compatible communication protocols and services.

A general overview of a network designated as a Kerberos realm or Kerberos domain is shown in FIG. 1. The realm or domain involves a number of principals which may be considered digital machines and wherein these principals involve clients or servers that are participating in the domain which is under the control of a particular Kerberos server.

Thus, as seen in FIG. 1, there may be a series of clients or client-terminals designated 10a, 10b, 10c... 10n. These units are connected to a network cloud 16 and a communications connector 18. There are a number of unique clients or servers 11, 12, and 13 which can be designated as principals. One of the principals such as principal 13, is seen having a UDP (User Datagram Port) port 15, which connects the third principal 13 to the Kerberos Server 20. The network cloud 16 is also connected to the communication connector 18 which is then connected to the Kerberos Server 20. The UDP port 15 is an acronym for the "User Datagram Protocol" port. The network cloud 16 is a generalized interconnection element which may indicate that various clients are residing in the network cloud.

A "realm" or a "domain" may denote a number of host servers or clients and principals involved in a single administrative domain designated as a Kerberos domain. The Kerberos realm can be considered as a term for modules participating in a Kerberos domain. There can also occur a number of different realms or domains which can be interconnected and which involve another level of complexity.

FIG. 1 could also have more than one Kerberos Server connected in with various network connections. The Kerberos Servers can communicate with each other and participate as part of the domain involved.

FIG. 2 indicates the Kerberos Server network with an expanded view of the principal unit 13. Here, the client terminal 10 is connected to the communications connector 18 which enables it to communicate and operate with various aspects of the principal 13 and the Kerberos server 20.

The typical principal 13 (ClearPath NX Server) is shown with a number of the basic functional elements. The bus 18c from the communications connector 18 is seen connected to the UDP port 26 of the Kerberos server 20. The bus further provides connection to the principal 13 via the IPX/NetBIOS (Netware process) 54 and the TCP/IP unit 56. The hardware IPX/NetBIOS provides similar functions to TCP/IP 56. IPX is an Internetwork Packet Exchange Protocol developed by Novell that sends data packets to requested destinations, i.e. workstations, servers, etc. NetBIOS and IPX provide the session, transport and networking layers of a protocol stack which handles communication between dissimilar systems.

The TCP/IP 56 (Transmission Control Protocol/Internet Protocol is a protocol for Internetwork communication between dissimilar systems.

The Ports module 52 provides an interface to the Telnet Unit 48, to the station transfer unit 46 and to the HLCNTS Unit 50.

The Telnet 48 involves a package switching network that enables many different varieties of terminals and computers to exchange data.

The station transfer network 46 functions to provide the necessary protocol for information transfer.

The HLCNTS 50 is a unit which provides the function of connection and communication between Netware clients and ClearPath NX clients.

The client information or message thus enters the principal 13 through the ports 52 and talks through the Telenet 48 and station transfer unit 46, through the DC WRITE Unit 44 which calls on the program COMS which is the communications management system (COMS 42). This in turn then communicates or talks to MARC 40 which is the Menu-Assisted System Resource Control program. MARC and COMS are Unisys Corp. A-Series program functions which were developed for the Unisys Corporation A-Series computer systems. When a client logs on to the A-series systems, a call is made on the MARC, that is to say, the Menu-Assisted System Resource Control program. The MARC 40 will function to call on the Kerberos Support Library (KSL) 34 in order to initiate the proper security functions.

The library module 38 designated GSS-API connects the MARC program both to the Support Library 34 and to a user data bank 36.

The encryption library 32 is connected to service both the Kerberos Support Library 34 and the GSS-API library 38.

The GSS-API library 38 serves the function of providing interface application programs to access available security services.

Also shown is the MCP internal service provider 33 which is part of the Unisys A-Series Master Control program (MCP). This includes a queue management function module and a UDP port management module 15. The MCP Service Provider 33 connects to a series of ports and also to the Telnet 48, the HLCN 50 and the station transfer unit 46. Additionally, the MCP Service Provider 33 (FIG. 2) is also connected as seen in FIG. 3 to COMS 42 and to the MARC 40 via MCP 60 as well as the Kerberos Support Library 34.

There are several functions that are provided by the MCP 60, but the major functional concerns are those which involve the passing of an asynchronous message in addition to handling the queue management 62 functions and management of the UDP port 15 in the principal 13. (ClearPath NX Server).

The client 10 enters his communications via the communication connector 18 and bus 18c over into the ports 52 and then talks through the Telnet unit 48 and the station transfer group 46 designated in block 50c. These units in turn call the COMS 42 which in turn talks or communicates with MARC 40 (Menu Assisted System Resource Control program). Both COMS and MARC are Unisys A-Series computer system functions described in the attached Glossary.

Figure 3:
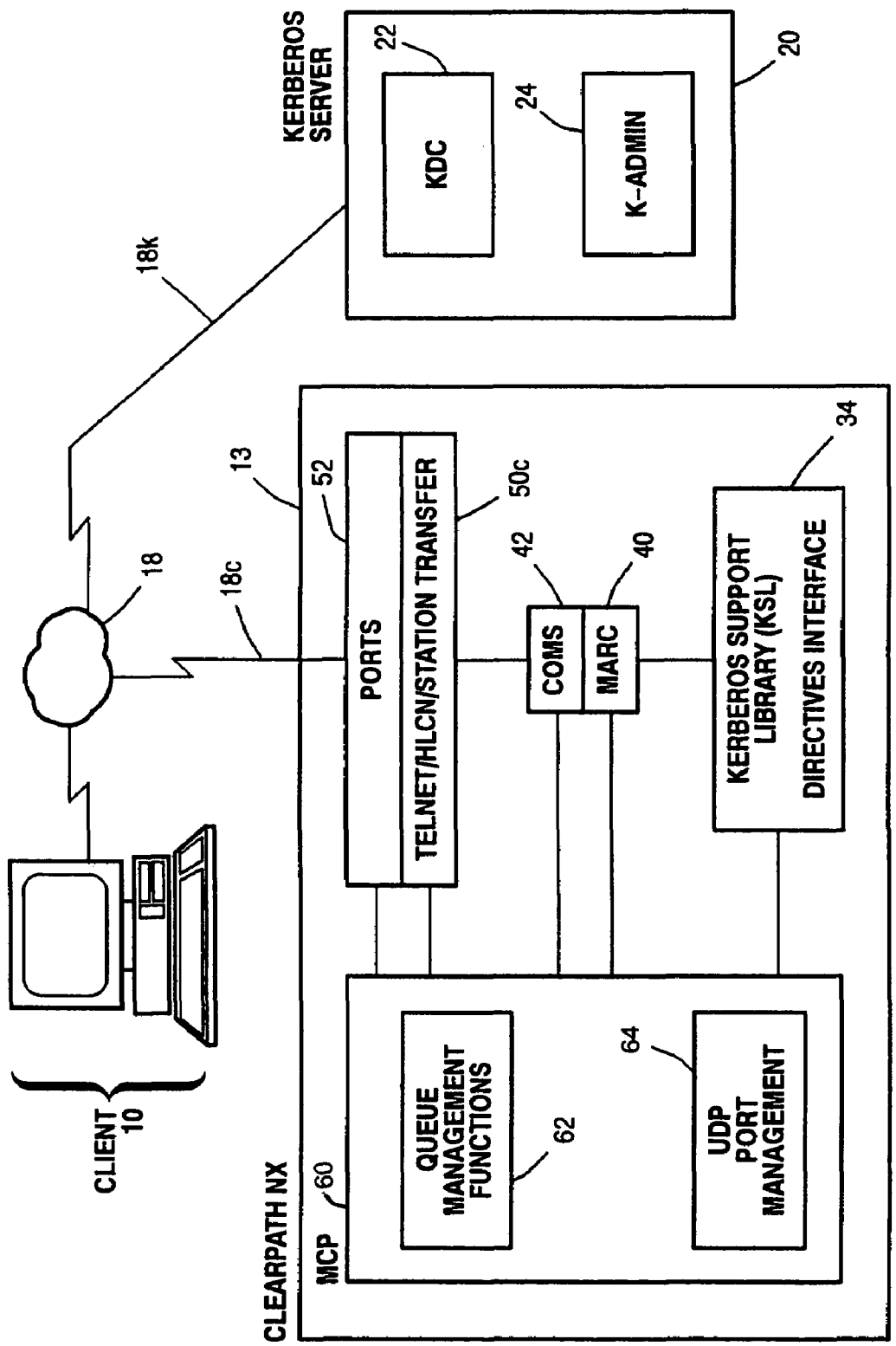
FIG. 3 is a drawing of the elements involved in an asynchronous message model involving a Kerberized environment.

Further regarding FIGS. 2 and 3, the Kerberos Server 20 is seen to have a UDP port 26, a Kerberos administrator K-ADMIN 24 unit and a Key Distribution Center 22 (KDC).

The function of the Key Distribution Center 22 (KDC) is to act as a trusted third party authority that holds the secret keys for all the principals in a realm. The KDC provides two services designated AS and TGS. "AS" denotes Authentication Service (AS): i.e., A service of KDC that verifies the authenticity of a principal. From "CyberSAFE Challenger Administrator's Guide" Version 5.2.5/April, 1995.

The function of the K-ADMIN 24 is to provide a program to perform administration of a remote Kerberos principal database. TGS is Ticket Granting Service (TGS). K-ADMIN is the part of the KDC that provides tickets when a client wants to access a server. From *"CyberSAFE Challenger Administrator's Guide"* Version 5.2.5/April, 1995.

The UDP port 26 functions to handle the User Datagram Protocol.

It may be noted that the UDP port 26 of the Kerberos server is provided with a communication line 18c through the TCP/IP 56 to the internal UDP port 15 (FIG. 2) of the principal 13 via bus 15b.

The two UDP ports (15 and 26) are two separate entities and reside in different machines. Each principal would have its own UDP port which then provides a special communications line to the Kerberos server, via the Kerberos server's UDP port, 26 (FIG. 2).

The principal 13 unit shown in FIG. 2 is also sometimes designated as a ClearPath NX server and describes one specific type of a principal 13.

FIG. 3 is a drawing showing the message model in a Kerberized environment. The client terminal 10 is here connected to the network connector 18 which provides a connection on bus 18k to the Kerberos server 20 and a connection on the bus 18c to the principal 13. This particular principal 13 is a specialized unit designated as the Unisys ClearPath NX. The Unisys ClearPath HMP (Heterogeneous Multiprocessing System) acts to integrate a number of platforms such as UNIX, Windows NT and Enterprise operating system environments by combining them into one platform.

Within the principal 13, FIG. 3, there is seen the port's interfaces 52 which connect to the combination unit 50c designated as Telnet/HLCN/Station Transfer. The HLCN refers to the high-level communication network. The combination module 50c then connects to the COMS 42 programs (Communications Management System) and also the MARC programs 40 (Menu Assisted Resource Control programs). Then as seen, the MARC programs connect to the Kerberos Support Library 34. Further in FIG. 3, the Master Control Program MCP 60 is seen connected to the ports 52, the combination module 50c, the COMS program 42 and the MARC program 40 and also the Kerberos Support Library 34. Each of the modules are connected to the MCP 60 (Master Control Program).

The Master Control Program 60 is shown to have two modules of which the queue management function module 62 provides the function of managing an array of Queues shown in FIG. 10.

Additionally in the MCP 60, there is a UDP port management unit 64.

The Master Control Program 60 is seen in FIG. 3 to have the queue management function module 62 which involves a Queue data structure which is shown in FIG. 10. As an analogy, the queue could be thought of as a pipe. For example, considering that there is a person involved at each end of the pipe such that Person A at the left end of the pipe and Person B at the right end of the pipe. Then, at the halfway point of the pipe, there could be considered a Person C. Then for example, Person A wants to move a ball (message) from one end of the pipe to the other. Person A with the ball, then asks Person C (halfway point) to tell Person B to wake up and notice that there is a ball coming down the pipe. Person C wakes up Person B and then tells Person A to insert the ball in the Pipe for delivery. Person C then moves the ball down the pipe and tells person B that "Yes, okay the ball is now here".

In the above analogy, it can be considered that Person A is the COMS program, while Person B is any one of the various Message Control Systems (MCS), and likewise, the Person C would be analogous to the Master Control Program (MCP). This is, of course, an over-simplified version, but it illustrates the role of the COMS program to the Message Control System programs (MCS) with the Master Control Program (MCP) acting as a "overseer/controller".

Queue Management Function 62 in the MCP 60 (FIG. 3): The MCP 60 controls the operational environment of the system by performing the functions of job selection, memory management, peripheral management virtual memory management, dynamic sub-routine linkage, logging of errors, system utilization, and queue management. More specifically, the MCP 60 manages an array of queues. A stack called the Datacomm Queue Stack (FIG. 10) holds messages (data descriptors) and other hidden messages.

The primary function of the Datacomm Queue Stack (FIG. 10) is to hold queues which are declared in DCALGOL language, and to file input queues for programs with remote files. The Datacomm Queue Stack also serves as one possible communication link between the Master Control Program (MCP) and the "IR" (Independent Runner) "Controller. "IR" stands for "Independent Runner" Controller which is a separate process that gets initiated during system initialization. This Controller handles functions such as Job Control (queuing of jobs, starting and stopping of jobs, operator command processing, etc.). The MCP initiates a number of "IR's" during initialization. A common name or nomenclature in the industry today would be to "spawn a separate process".

The Datacomm Queue Stack is seen in FIG. 10. The first word in the stack contains a TOSCW (Top of Stack Control Word), while the second word contains a link.

This link is the start of a link list of available queue locations and is relative to "Word 1" of the stack. Locations in the stack that are not a part of this list are "data descriptors" that point to hidden messages. The "hidden messages" contain the head and the tail pointers of queue entries, plus attributes of the queue, such as the memory limit and the population.

As messages are placed in the Datacomm queue, (FIG. 10) the queue's memory limit may be reached. In this case, if the queue's limit is reached, a Tank Information Block (TIB) is built, then disk rows are obtained with the procedures called GETUSERDISK and the subsequent messages for the queue are TANKED, that is to say, written to disk. It may be indicated that the queue messages will not be found in memory and disk at the same time. They will either be queued on disk or in the memory, but not both.

"Word One" in the stack is the beginning of a linked list of available stack locations. Other locations will point to the "hidden message". The Tank information Block (TIB) contains a variable number of Row Address Words. These Row Address Words point to the disk area.

Further in FIG. 2, the network cloud 16 and con-connector 18 are seen having communication busses 18k and 18c over to the Kerberos server 20 which has a Key Distribution Center Unit 22 and a Kerberos Administrator Unit 24. The Key Distribution Center unit 22 functions to provide secret access signal codes (keys) to enable message access.

The UDP port management unit 15, FIG. 3, involves the User Datagram Protocol (UDP) which is a TCP/IP protocol that permits an application to send a message to one of several other applications running in the destination machine. The "send message" Application is responsible for providing a reliable delivery of the message.

In regard to the preliminary steps which lead up to and through a request for service so that there can be enabled the return of a synchronous or an asynchronous message in response to the client request, it will be seen that there are several assumptions which must be considered as residing in place before the detailed functioning of this model can be operative. These assumptions include:

(i) The client or principal who is requesting a service must be recognized as a valid client or a valid principal within the Kerberos realm.

(ii) By use of the word "valid", the participant must already be logged on and be recognized within the Kerberos realm. The participant will have and be given all the rights that any other "Kerberized" client or principal might expect to have within the Particular Kerberos Realm of participation.

(iii) The individual data which moves between the Unisys NX server software will not be particularly described other than to indicate that the request was "passed" to the next layer of software as appropriate. The data moves between various software packages in itself. A simple assumption will be made that data "is passed" between the software.

Briefly, a client or principal must already have been "logged on" within a Kerberos Realm and thus be provided with the same privileges as that provided any "Kerberized" client or principal's expectation of privileges.

The references made below to a client will, of course, assume that the client or principal is participating in a Kerberos Realm. As a further assumption for this description, it will be assumed that there is a person or a client operator sitting at a personal computer (PC) with Kerberos privileges.

FIG. 4 is a generalized flow chart indicating the operations occurring upon initiation of a service request by a client. The service request (a) shown in FIG. 4 comes into COMS (b) and COMS will view this as a request to MARC or to an MCS (message Communication System) as seen in FIG. 8. The COMS program at (b) FIG. 4, will indicate that this was a request which was either a MARC request or a MCS request which is shown at block (c1) and block (c2), which is the MCS request.

At position (b) of FIG. 4, where the COMS program routes the request to the MCS or the MARC, the term "routes" or the term %% passes" in this instance implies that a request or a message is being moved via a queue (queuing structure) from one software stack to another software stack. This move, via a queue, is accomplished by transferring the request or message data from one stack's environment, to another stack's environment (FIG. 10) by passing a "data descriptor" which points to an area in memory where the data can be found. The management of this function is provided by the MCP 60. This likewise applies to position (i) of FIG. 4 which indicates that the Kerberos Support Library 34 passes the response via queue to the MARC program, 40.

Now referring to position (k) of FIG. 4 which indicates that the "MARC" program returns the service requested, the term "returns" implies the use of a queue for communicating both through and to the COMS program which is an ancillary process occurring each time that MARC communicates outside of its stack environment. The MCP 60 provides low-level queue management functions with COMS providing the higher-level queue management functions.

It is understood that when a client has made a service request, the client is communicating over the FIG. 3 communication bus 18c, then through the TCP/IP protocol 56 (FIG. 2) in order to access the COMS program 42.

Now taking the leg (of FIG. 4) shown at (c1) which is the MARC-request for Kerberos service, here there is provided a specialized process where the MARC program requests service from the Kerberos Support Library (KSL) 34 at (d1). Once the Kerberos Support Library receives a request for service, then a decision tree ("A") at position (e) of FIG. 4, is shown as decision tree "A" which raises the question of—is this going to be a "asynchronous message" (yes, Y) or is this going to be a "synchronous" message (no, N).

If the answer is "no" (N), that is to say, it is not an asynchronous message but merely an ordinary synchronous message, then this can be handled normally in the next block (f1) where the Kerberos Support Library 34 notifies MARC 40 that the response is to be "synchronous".

Then two operations are presented for execution at (f1) (FIG. 4) at this time. The system will let MARC know that it is waiting for response at (j), or otherwise at (g) the Kerberos server (or Kerberos Support Library) is going to go ahead and process this request. Alternately, there is the factor that this request can be serviced locally by KSL 34. This is shown in the block at element (g) which indicates the statement that the Kerberos Server (20) or the KSL Library (34) is processing the request. This means that the service can be accomplished via the Kerberos Server 20 or locally on the Kerberos Support Library 34. In the event that it is on the Kerberos Server 20, the system will then receive a response back from the Kerberos Server and then the Kerberos support Library will pass that response on to MARC at step (i). This is shown at blocks (h) and (i) after which the response is sent to the MARC program at the (j) block of FIG. 4.

On this particular synchronous message path, it is expected that the response will occur within milliseconds. Thus, when MARC at position (k) returns the service requested, the client 10 will be informed and the program will stop at (L), in order to end the process.

The term "service" here means that a request (a Kerberos command) has been made. This request for service is the processing of the Kerberos command. An example of a service request would be:

(a) Client wants to change his/her Kerberos password;
(b) From MARC the client enters:
  KRB PASSWORD <old password> <new password> <new password>
(c) Upon entering this command, the client workstation would receive the message as follows:
  Your KRB command is being processed. The response to this command will be placed in your system messages queue. You will be notified when your request has been serviced.
After an indeterminate period of time, the client workstation will receive a message:
  You have a message in your system messages queue.
When the client examines his/her system messages queue, the following message(s) could be displayed.
  Your password has been successfully changed. or
  Your password has not been changed. <Error reason>

Again referring to FIG. 4 and observing the decision tree at (e) where the block "A" on the decision tree takes the "Yes" path "Y" to indicate the "asynchronous request." The "Yes" (Y) branch goes to block (f2) which indicates a separate process "C" which involves the processing of asynchronous messages and the handling of these messages.

This involves a separate sequence (via process "C") which is shown in FIGS. 6 (A,B) and 7 (A,B).

Referring to FIG. 4 and proceeding from step (b) on the leg where the request is routed to the MCS (rather than to MARC) as indicated at block (c2). This is a MCS (Message Control Management System program) for Kerberos service which then evolves to block designated (d2) which indicates a process "B" which is subsequently shown and discussed in FIG. 5.

It may be noted that in FIG. 4, referring to the "synchronous" message passing branch "N" (No) at decision block (e), that the Kerberos Support Library 34 notifies the system that the MARC response was to be "synchronous" and then this is passed on to the Kerberos Server 20 at the Kerberos Support Library 34 which then receives the response. Then the Kerberos Support Library passes the response back to MARC at position (j) where MARC was waiting for the response after which at step (k) the service requested was returned by MARC to the client 10, so that at (L) the process came to a stop.

The channel on FIG. 4 which goes from block location (b) over to block location (c2) involves an MCS-request for Kerberos service. This then involves the process block "B" which is designated at location (d2) and is discussed hereinafter in regard to FIG. 5 (Process "B").

FIG. 5A will indicate a series of flowchart steps labeled B1, B2 ... B6 which involved an earlier used sequence. At position B1, the MCS request is generated and fed at B2 to the Kerberos Support Library 34 (FIG. 3) which receives the request and calls the Kerberos Server 20. Then at location B3, the Kerberos Server 20 will process the request and return it back to the Kerberos Support Library (KSL 34).

At step B4, the Kerberos Support Library delivers the service request via directives over to the MCS where upon, at step B5, the COMS process 40 routes the message to the appropriate MCS. Thereafter at step B6, the MCS receives the requested service, at which time this process cycle is brought to an ending, after notifying client 10.

The transition of the message (data) between B5 and B6 is accomplished via a queue. The Message Control Systems (MCS) will communicate outside their environment (stack) by using queues. In this instance, when the COMS program receives a message from the Kerberos Server Library 34, it forwards the message to the appropriate Message Control System (MCS) by placing the message into a queue array. Both the MCS and the CONS programs "know" about the existence of the queue and operate to monitor it by means of what is called an "Event". The message Control System (MCS) is waiting for an "Event" to "happen" which will then wake up the process MCS and will extract the information (data) which it now has a visibility to. The "Event" handling, the moving of data from one environment to the other is controlled by the MCP 60.

While the earlier provided systems shown in FIG. 5 required the time-consuming factor of calling the Kerberos Server which was then required to access the Kerberos Support Library after which the Kerberos Support Library had to respond, it will be seen that under the presently disclosed improved system, there is no longer any need for the double jump action of accessing both the Kerberos Server and the Kerberos Support Library since under the improved system, the Kerberos Support Library can provide an immediate synchronous response without the need to access the Kerberos Server 20. This will be seen in connection with FIG. 11 which is a simplified description of FIG. 1.

Figure 11:
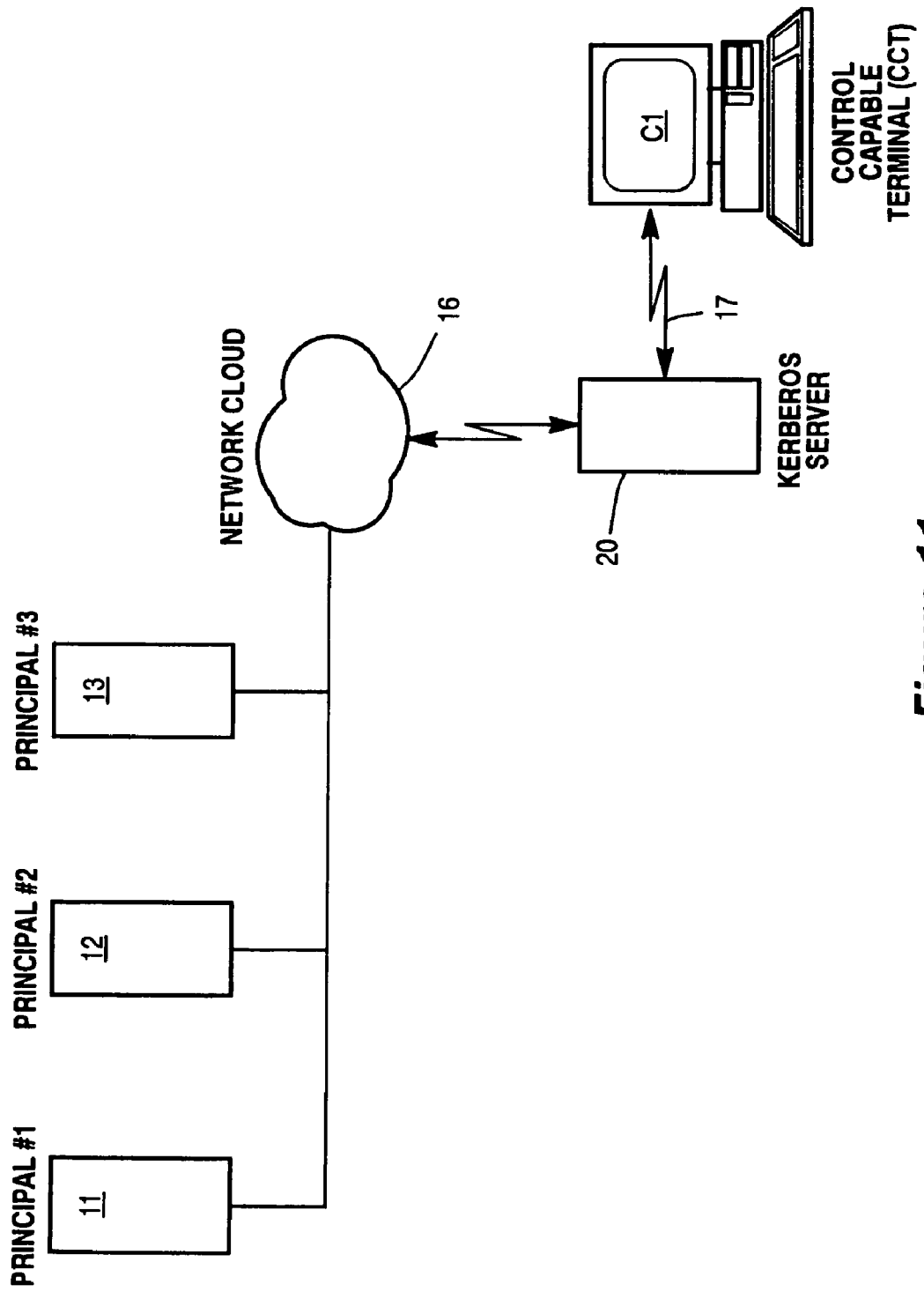
FIG. 11 is a simplified view of the Kerberos realm using the Expedited Synchronous Message Process.

As will be seen in FIG. 11, a series of principal modules 11, 12, and 13, are connected to network cloud 16 to the Kerberos Server 20 which maintains a communication relationship on line 17 to the Control Capable Terminal (CCT). The difference between FIG. 11 and FIG. 1 is the addition of the Control Capable Terminal designed C1. A Control Capable Terminal (C1) is a terminal capable of entering secure administrative commands which are recognized by the Kerberos Server 20. The CCT (C1) may be a physical unit attached to the Kerberos Server 20 via a local area network connection 17 or could even be physically included within the Kerberos Server 20 such that the CCT would reside as administrative software in the Kerberos Server 20.

Figure 12:
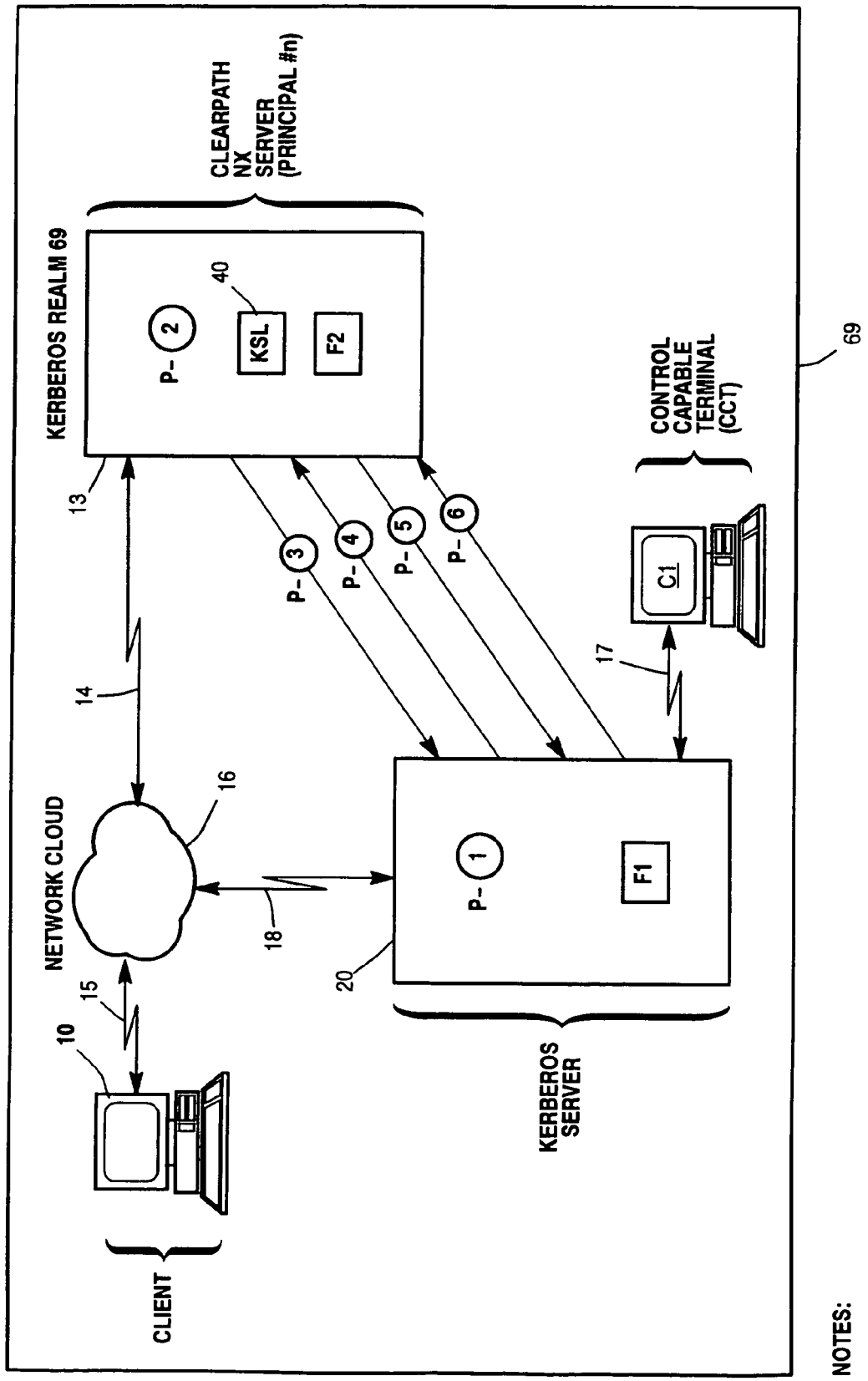
FIG. 12 is an exploded view of the process steps involved in the Expedited Synchronous Message Response in a Kerberos realm.

FIG. 12 is a schematic view, specific to a particular simplified Kerberos realm designated 69 which uses the expedited synchronous message model. Here there are seen three basic constructs which may be considered as four constructs if the Control Capable Terminal, CCT (C1) is included. These constructs process or manage the synchronous message within the Kerberos Realm 69.

It may be noted there may be additional principals 13 as seen in FIG. 12 and also clients 10 within this realm or multiple realms. However, for this model there will be only one Kerberos Server 20 within any given particular realm. The following is a discussion of the processes involved in expediting synchronous message traffic over to a client 10.

Referring to FIG. 12, there is seen a client 10 connected to and from a network cloud 16 via the communication channel 15 while the network cloud 16 has communication channels 14 to the ClearPath NX Server 13 and also via channel 18 to the Kerberos Server 20. The Kerberos Server 20 has a communication channel 17 to C1 which is the Control Capable Terminal. Shown also in FIG. 12 is a series of independent or dependent processes or tasks which are designated with the letter P. The process P1 related to the Kerberos Server 20 is performed by the Kerberos Server 20 and is the initialization process of the Kerberos security mechanism resident on the Kerberos Server 20. This process P1 processes the information stored in a file designated F1 which resides in memory on the Kerberos Server 20 or it may reside as a disk file which can be accessed by the Kerberos Server 20.

The file F1 contains various information about the specific Kerberos realm 69 involved for which it, 20, is the Kerberos Server. It may be stated for this discussion that there will no longer be any further mention of multiple Kerberos realms and/or slave Kerberos Servers which may possibly exist within any given realm. The described model will focus on a relationship of one server to one realm.

Information in the configuration file F1 will contain information about its realm name, other realm names, and information about the principal (s) 13 which are within its sphere of control. Additional information about the clients 10, which also are often called principals, is also found here. The process P1 of FIG. 12 is completed after various initialization duties have been completed. At the completion of the process P1, the Kerberos Server 20 is now "available" for general processing of requests from any client 10 or any principal 13 or any realm.

Process P2 of FIG. 12 is seen in the ClearPath Server at P2 and is the Kerberos initialization process for the ClearPath NX Server 13 which is also designated as a principal. The process P2 reads information stored in its configuration file F2. The information stored in this file F2 at initialization time is the realm name for which the principal 13 wishes to consider itself as belonging to that realm. Upon completion of the initialization process P2, the ClearPath NX Server 13 will now be able to process requests from other principals or clients 10 via the various network connections shown in FIG. 12 as 14, 15, 16, and 18.

At any given time after completion of the process P1, then services may be requested of the Kerberos Server 20. In addition, changes may be requested by a client 10 or a principal 13 about its configuration or operational status. However, system wide changes or changes made by the administrator at the CCT (C1) for a particular client are stored in the file F1 in the Kerberos Server 20.

The file F2 in the ClearPath NX Server 13 does not yet contain the "change" that already has been stored in the other file F1. When a "change" occurs, a programmatic event changes the state on the Kerberos Server 20. This change is also noted on the ClearPath NX Server 13 via the communication links 18, 16 and 14 and the process P5 is then initiated by the ClearPath NX Server 13. This process request will execute data transfers so that any change made to the file F1 (in Kerberos Server 20) will be forwarded to the ClearPath NX Server 13 and then recorded in the file F2 of the principal 13. The files F1 and F2 are called "Configuration Files" and contain the name of the Kerberos realm plus the names and attributes of the principals participating in that realm. The Kerberos Security Administrative Commands are a method of requesting information from the configuration file, about the principals and the attributes associated with each principal.

Kerberos Server 20 initiates the process P6, forwarding the updated data to the ClearPath NX Server 13. This process or processes are repeated as necessary to keep the files F1 and F2 in a synchronous state.

The client 10 makes requests for service related specifically to itself as client 10. Here it is assumed, at this point, that the client 10 has been authenticated and has or has been actively participating with the Kerberos realm 69 as administered by the Kerberos Server 20. A request for service by the client 10 is passed by some combination of network communication links such as 14, 15, 16, etc. through the ClearPath NX Server 13. Since the ClearPath NX Server 13 had been previously been "updated" about any changes via the process P6 of FIG. 12 by the Kerberos Server 20, the ClearPath NX Server 13 can directly respond in a synchronous manner (in behalf of the Kerberos Server 20) back to the client 10 via the communication links 14, 16 and 15.

Now as a result, prior to the improved expedited message control system, the earlier system would operate such that a request for service was made by the client 10. This request would then be forwarded to the ClearPath NX Server 13 via the communication links 15, 16 and 14. Then the ClearPath NX Server 13 would query the Kerberos Server 20 via the process P3 each time that a request for service was initiated by a client 10. Then the Kerberos Server 20 would respond to this request (P3) via the process P4 returning the response to the ClearPath NX Server 13 on behalf of the client 10. Then in turn the ClearPath NX Server 13 would return the requested information via the communication links 14, 16 and 15. Unfortunately, this method was rather time consuming with considerably delays which could be expected since very often the Kerberos Server 20 was under a heavy load. In addition to the communication links and protocols used to transport data via the process P4 using the links 18, 16 and 14, these links were relatively slow and required additional overhead during many time-critical requests.

As a result, the improved expedited system as seen in FIG. 12 operated in a much more expeditious fashion. Here, the client 10 makes a request for service related specifically to itself as client 10. Of course, it is assumed at this point that the client 10 has been authenticated and is or has been actively participating within the Kerberos realm 69 as administered by the Kerberos Server 20. A request for service by the client 10 is then passed by a combination of network communication links such as 15, 16 and 14 over to the ClearPath NX Server 13. Since the ClearPath NX Server 13 had been previously "updated" about any changes via the combination of the process P5 and P6 by the Kerberos Server 20, now the ClearPath NX Server can directly respond to the client 10 in a synchronous manner on behalf of the Kerberos Server using the communication links 14, 16 and 15. Thus this avoided the variable delays associated under the earlier system which required communication links 18, 16 and 14.

Figure 14:
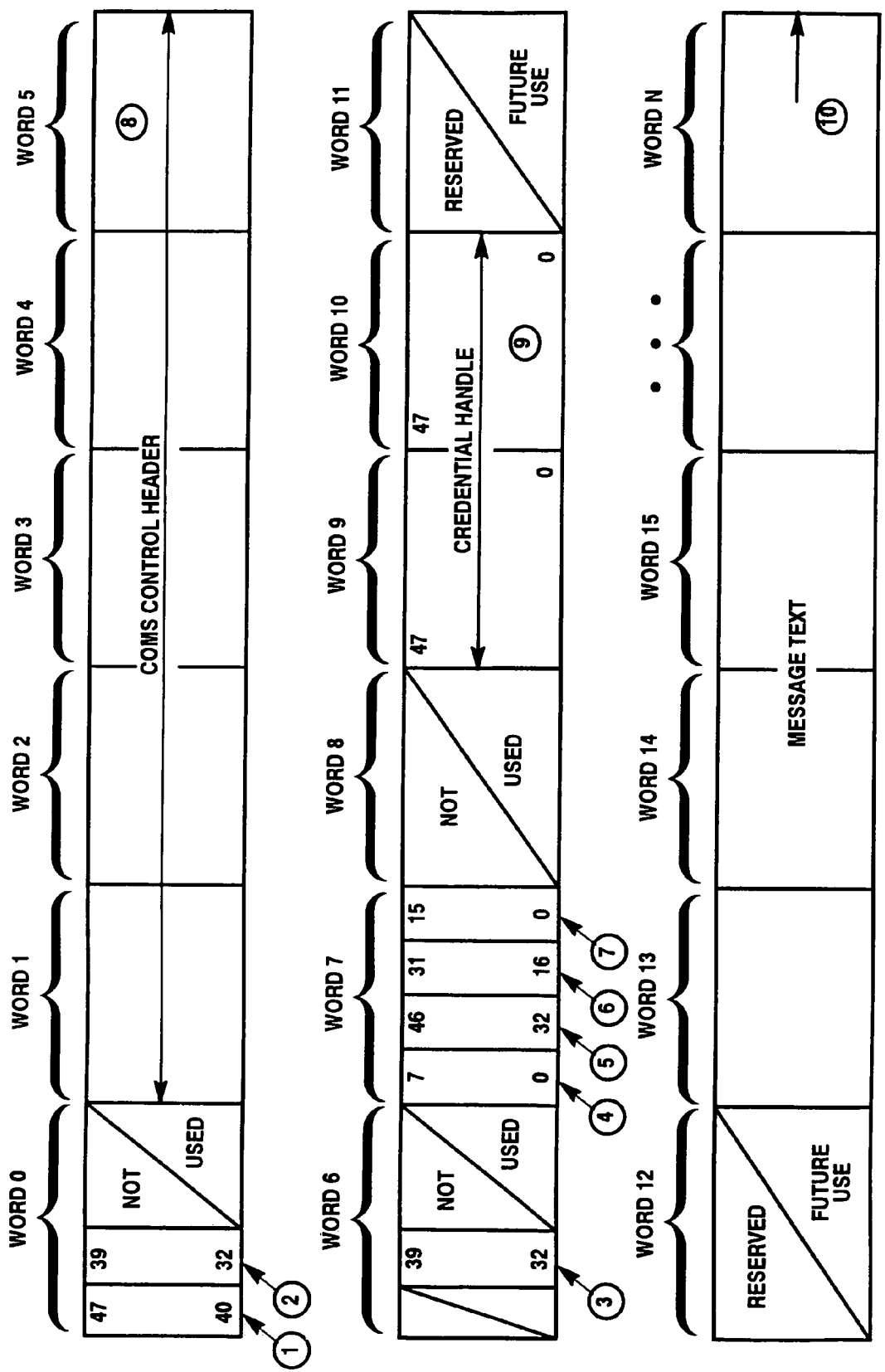
FIG. 14 is a diagram showing the word layout for the COMS (Communication Management System)

FIG. 9 (9A, 9B, 9C) indicates word formats on the ClearPath NX Server and shows the MARC message layout, the MCS message layout, and the message display format. A word (FIG. 13) consists of forty-eight data bits and three leading control bits which define the type of word. The control bits for words shown in FIG. 13 are all zero; making the control value zero. FIG. 14 is a conceptual diagram of a word array that is passed from process to process. The words as marked in FIG. 9 are represented by FIG. 13 and can be referenced as such. The passing of messages asynchronously uses a message array containing a header and message data. In this particular instance the data is being passed from the Kerberos Support Library, KSL, FIG. 3 (34) to MARC, FIG. 3 (40).

The details associated with FIGS. 13 and 14 is as follows:

Words zero through five are control words (information) for KSL to communicate and route a message to/from COMS. Words six and up contain control and text data which is interpreted by MCS(s), such as MARC, which will in turn ultimately route the message to the appropriate client.

MSG[0] The boldface item numbers (#) below refer to the encircled item numbers in FIG. 13.

1[47:08]:=13% tells COMS to route message to MARC

2[39:08]:=1% tells COMS incoming message from KSL
   [31:321: 0% NOT USED FOR THIS IMPLEMENTATION

8 MSG[1]–MSG[5]
   COMS CONTROL HEADER—NOT USED FOR THIS IMPLEMENTATION

NOTE: MSG[0] through MSG[5] are used by COMS and will be removed before delivery to any MCS.

MSG[6]
   [47:08]:=0% NOT USED FOR THIS IMPLEMENTATION

3 [39:08]:=X % tells COMS incoming message from KSL
   [31:32]: 0% NOT USED FOR THIS IMPLEMENTATION

7 [15:16]: <description>; % Error #, ID expiration

MSG[8]
   For MCS(s) other than MARC
      [47:48]: <identity word #2>
   for MARC
      Not used.

MSG[9]–MSG [10]
   For all MCS(s) and MARC specifically related to logon and KRB INIT

9 Credential Handle.
   For all MCS (s) and MARC specifically related to logon and KRB INIT
   Not used.

MSG[11]–MSG[12]
   Reserved for future use.

Figure 15:
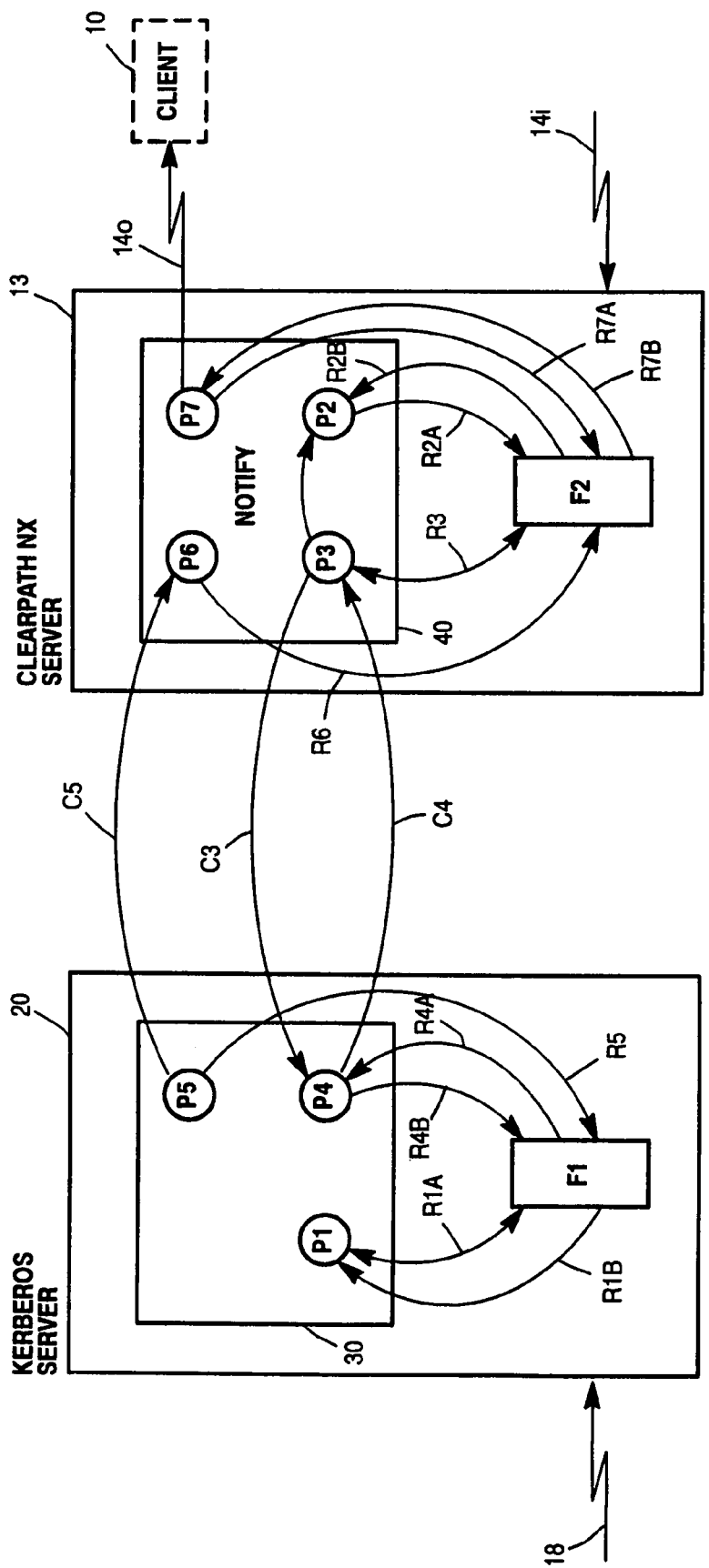
FIG. 15 is a schematic drawing derived from the process steps of FIG. 12 to indicate the sequence of updating operations between the Kerberos Server and ClearPath NX Server in a synchronous response method and system.

MSG[13]
    For all MCS(s) and MARC
    <start of text message>
NOTE: The highlighted numbers listed above, for example, #10, correspond to the circled number in FIG. 14.
The values for X in field [39:08] are as follows:
13: An asynchronous message from KSL (not Controller); identifies a message related to the KRB INIT command or non pre-authenticated logon indicating the request was successful.
15: An asynchronous message from KSL (not Controller); identifies a message in which an error occurred during the processing of the KRB INIT command or non pre-authenticated logon.
16: an asynchronous message from KSL (not Controller); identifies the message as a response to any KRB command other than KRB INIT. The response returned indicates a successful inquiry.
22: An asynchronous message from KSL (not Controller); identifies a message in which an error occurred during the processing of a KRB command OTHER THAN KRB INIT.
4 [7:8]:=<text length (characters>; % Message length
MSG[7]
    For MCS(s) other than MARC
        [47:48]: <identity word #1>
    For MARC
5[46:15]: <trans id>; % Transaction identity
6[31:16]: <dialog #>; % Dialog number FIG. 15 depicts a process flow diagram of the independent and dependent process associated with an expedited synchronous message control model.

Figure 16:
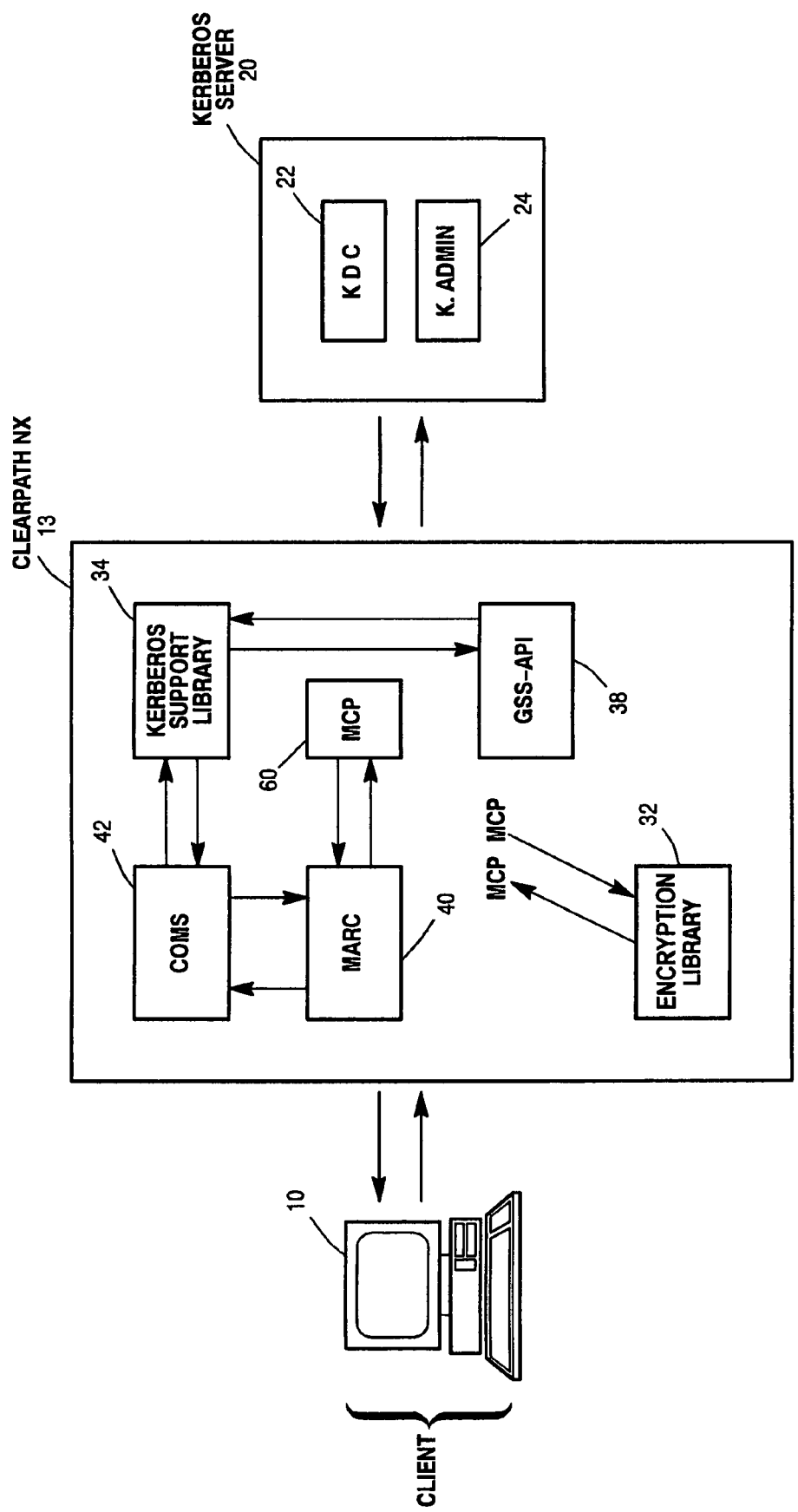
FIG. 16 is a drawing showing an overview of the Kerberos client authentication arrangement via the asynchronous message model.

In FIG. 16, which is an exploded view of both the ClearPath NX Server 13 and the Kerberos Server 20 from FIG. 12, it should be assumed that the communication channel(s) 14 and 18 (FIG. 12) ultimately are connected via a LAN (Local Area Network) and/or a WAN (Wide Area Network) connection with facilitates communication between these two principals (servers) within the Kerberos realm.

During the initialization phase of the Kerberos Server 20, an independent process P1 is responsible for obtaining information stored in file F1 (FIG. 12) which is either stored on a disk either locally or as a file which the Kerberos Server disk either locally or as a file which the Kerberos Server has visibility to, via a network. The process P1 initiates a read R1A which obtains realm for which the Kerberos Server 20 administers. The information is returned from file F1 via read result R1B to process P1 which builds any internal structure(s) necessary to administer the Kerberos realm. At this time the Kerberos Server 20 is now "available" to process any request from any principal or any other realm.

Independent of process P1 (FIG. 15) on the Kerberos Server 20, process P2 (in Server 13) is the initialization process of the Kerberos Support Library 40 (FIG. 2) resident on the ClearPath NX Server 13. Process P2 functions in a similar method to that of process P1. Process P2 executes a read R2A on the file F2. The read result R2B from file F2 returns information about any principal(s) it had been previously been made aware of, along with the "name" of the realm for which it is a member and any other configuration information. Once process P2 has completed the read operation it processes off to a dependent task P3. Process P3 initiates an update request for realm and principal information. This request is a call C3 to the Kerberos Server 20. Process P4 which, if not already initiated, is processed off.

The incoming call C3 indicates to process P4 that an update is being requested. Process P4 executes a read R4B of file F1. The read result R4A is returned to process P4. Process P4 packages the information using a shared mutually agreed-upon protocol and initiates a return C4 back to process P3 which has been waiting. Process P3 executes a Write R3 to file F2. Upon completion of this task, process P3 notifies process P2 of the success or failure in obtaining current information from the Kerberos Server 20. Process P3 now terminates regardless of the outcome of the update. If the update process P3 returned a result indicating failure, process P2 waits a predetermined period of time. After that time period has expired the above process P3 is repeated. This continues until process P2 obtains a successful result and is made "available" to perform Kerberos-related functions. If the information was successfully returned, process P2 finishes its initialization by making the ClearPath NX Server 13 "available" to any principal requiring service. At this point in time both files F1 and F2 on the Kerberos Server 20 and the ClearPath NX Server 13 share in a state of synchronicity.

Once files F1 and F2 have been synchronized (FIG. 15), any requests received by the ClearPath Server 13 can be responded to directly. In the event that a change has occurred on the Kerberos Server 20, the change is noted and file F2 is updated. A corresponding change is noted and file F1 is updated. A corresponding change is necessary on the ClearPath NX Server 13. To accomplish this "update" the Kerberos Server 20 initiates the process P5. Process P5 processes changes received by the Kerberos Server 20. As part of the update process, process P5 initiates call C5 to the ClearPath NX Server 13. The ClearPath NX Server 13 initiates process P6 which in turn performs a "Write" operation R6 which updates file F2. Once again at this point files F1 and F2 are again synchronized. Process P7 handles requests made via communication line 14i, (FIG. 15). When a service is requested, the Kerberos Support Library 34 initiates process P7. Process P7 starts a Read R7A from file F2. The Read result R7B returns the requested information. Process P7 is then able to return a message in response to the clients' request via communications line 14o. The time-saving shown here is that process P7 has a single read/process to return the result to the client. Without initial and event-driven updates, the processes P3, P5, P6 would have to be performed while the client waited. This is no longer the case, and a fast immediate response can now be effectuated to provide the appropriate response to the client.

FIG. 6 is a flowchart comprising FIGS. 6A and 6B illustrating the steps involved in the handling of an "asynchronous service" request from the MARC processes 40. This block involves the "C" block which was indicated in FIG. 4, at position (f2).

Operational Processes for Block Process "c" (FIGS. 6A, 6B)
Asynchronous Service Request from MARC:
(1) A User-operator residing at a client work station 10 requests a service via a Kerberos command using the MARC processes. (a, b, c1, d1, e, f2, of FIG. 4).
(2) This request is processed at the client work station 10.
(3) The client work station 10 forwards this request to the appropriate Unisys ClearPath NX Server 13 (FIGS. 2,3) via the client's functional transport mechanism. For example, this might be Net BIOS over the IPX or over the HLCN, the Telnet or Station Transfer Unit, etc. of FIG. 3.
(4) Regardless of which one of these transport mechanisms is used, the request is received by the Unisys NX Server 13 and all the network processing will occur such that the service request is received at the appropriate networking host software level via elements 46, 48, 50, FIG. 2, whose software functions to communicate with PC based terminal emulators.

(5) The networking host software passes this request to the COMS 42 for distribution (at position b of FIG. 4). Networking software (46, 48, 50, 52) on the NX Server 13 takes the message and constructs additional levels of protocol such as transport, session, and networking used to route messages on a network.

(6) COMS upon receiving this request (b), (FIG. 4) validates that the MCS request is valid. In this particular case, this particular request is to be processed by MARC 40, via (c1) (FIG. 4). AS such the COMS(b) will strip header information intended for its use and then add header information intended to direct a request to MARC 40(c1) and the information to help MARC with the internal processing.

(7) MARC 40 receives the service request and notes that the request is a Kerberos command (c1, FIG. 4). The processing of Kerberos commands is handled outside of the MARC environment via the directives Portion of the Kerberos Support Library (KSL) 34 (FIG. 2).

(8) MARC 40 then calling the directive's interface, passes the Kerberos command to the Kerberos Support Library 34, FIG. 3 (KSL) for processing.

(9) The KSL 34 receives the request (d1, FIG. 4) to process the Kerberos command. This will be seen to correlate to step (i) of FIG. 6A).

(10) The Kerberos Server Support Library 34 scans the Kerberos command to determine if the response to the command is to be returned synchronously or asynchronously (position (e) of FIG. 4A), to the original requester which correlates to step (ii) of FIG. 6A.

The assumption will now be made that all further operations will refer to "asynchronous" responses.

(11) The Kerberos Support Library 34 determines that the response is to be asynchronous (Y=yes). At this stage, the KSL 34 must obtain additional information from the immediate requester (MARC 40) about the originator. The KSL (ii, FIG. 6A) must also inform MARC the response will be returned asynchronously. FIG. 4 indicates the block "C" at position (f2) which indicates the subsequent sequences which will be described in FIGS. 6A, 6B and 7A, 7B. The following steps 12 through 34 provide an initial generalized summary of these actions.

(12) The Kerberos Support Library 34 requests (vii, FIG. 6A) the client-originator information and builds a request to be sent to the Kerberos Server 20. In addition, it builds a message (in clear text form for display) which message can be used or discarded by the originator. The message states that the response to the Kerberos command which was entered will be returned "asynchronously" as an unsolicited message.

(13) MARC 40, having been notified that the response to its request will be returned asynchronously, notes the dialog number of the specific user who has entered the Kerberos command.

(14) MARC assigns a "TRANSACTION_ID" (transaction number) for this request and then stores this along with the MARC dialog number.

(15) MARC, ignoring now the KSL-generated clear text message, then builds a message for the originator and sends the message.

(16) MARC releases the session (iii of FIG. 6A) which has been waiting for a response. As a result, the originator is now free to perform other tasks (v of FIG. 6A).

(17) MARC forwards the TRANSACTION_ID over to the KSL 34 (Kerberos Support Library) which has been waiting for this information.

(18) The Kerberos Support Library (KSL 34) sends a request to the Kerberos Server 20 requesting service by performing a Write request over to the UDP port 26 (FIG. 2) (vii of FIG. 6A).

(19) The Kerberos Server 20 detects activity in the UDP port 26 and then Reads the request.

(20) The Kerberos Server 20 then performs the service. After an indeterminate amount of time, the Kerberos Server 20 with the response formatted, writes to the UDP port 15 of the ClearPath NX Server (FIG. 2) which is then detected by the KSL 34.

(21) The Kerberos Support Library (KSL 34) performs a Read on the UDP port 15 and obtains a response.

(22) The KSL 34 matches control information returned by the Kerberos Server 20 and builds a response constructing an appropriate header, together with the stored TRANSACTION_ID.

(23) The KSL 34 calls an export procedure in the master control program (MCP internal provider 33, FIG. 2) which then delivers a message from the KSL 34 to COMS 42 via an intercom queue. This intercom queue is located in FIG. 3 within the queue management function block 62. Its function and layout is further shown in FIG. 10.

(24) The master control program MCP 60 FIG. 3, causes an event which is monitored by MARC (with COMS as an intermediary) for its intercom queue and then inserts the response.

(25) This response is passed from the MCP 60 over to COMS 42 on behalf of MARC 40, FIG. 3.

(26) COMS transforms this response into a message format that MARC 40 can now decode.

(27) MARC detects an "event" has been caused which notifies it that an "unsolicited message" has arrived.

(28) MARC 40 examines the message and notes that the message, that has arrived, is a message response to a Kerberos command.

(29) MARC prepares to deliver the message by matching the TRANSACTION_ID over to a MARC Dialog Number. If the Dialog Number is still active and had previously initiated a Kerberos command, MARC puts the message in a displayable format for delivery. However if the Dialog Number is no longer active, the message is then discarded.

(30) MARC 40 then passes the message over to COMS 42 for actual delivery.

(31) COMS passes the messages to the networking software on the NX Server 13.

(32) The networking software on the NX Server then constructs a message using the appropriate transport protocol mechanism, such as Net BIOS, TCP/IP, and so on for transport to client 10.

(33) The incoming message is then processed on the client workstation 10.

(34) The User-operator sitting at the client workstation 10 is then notified that a message has arrived for his or her review.

FIGS. 6A and 6B show flow chart diagrams illustrating the operational steps of the processes involved in the location (f2) designated block "C" of FIG. 4. As seen in FIG. 6A, the Kerberos Support Library receives a request for service (i). Then the Kerberos Support Library notifies the Menu-Assisted Resource Control Program (MARC) that an "asynchronous" service is requested (ii). At branch 61, (FIGS. 6A and 7A) the MARC process notes the details of the client and "releases," at step (iii), the session. The "session" is used to denote the active connection between a User and a computer or between two computers. This provides an input back to the original requester 10 which then leaves the client free to initiate a new service request, step (v), thus to continue with further operations even though the service for the original request was not yet provided by the Kerberos server 20.

Returning now to the FIG. 6A block designated (ii) where the KSL 34 notifies MARC 40 that an asynchronous service is requested. Now, the process cycle 62 (FIGS. 7A, 7B) occurs over at location step (vii), FIG. 6A, where the Kerberos Support Library builds a service request and stores the "client information". This then proceeds to location (viii) FIG. 6A at which the Kerberos Server 20 processes the service request. Then, at location (ix), here, the NX server 13 receives the asynchronous response after which at location (x) the Kerberos Support Library receives the message. An auxiliary operation can occur at location (x) where the path 63 indicates that the Kerberos Support Library then builds a message header at location (xii).

Then, at position (x), the Kerberos Support Library having received the message continues on to position (xi) designated as "P" which continues as shown in FIG. 6B.

Figure 7A:
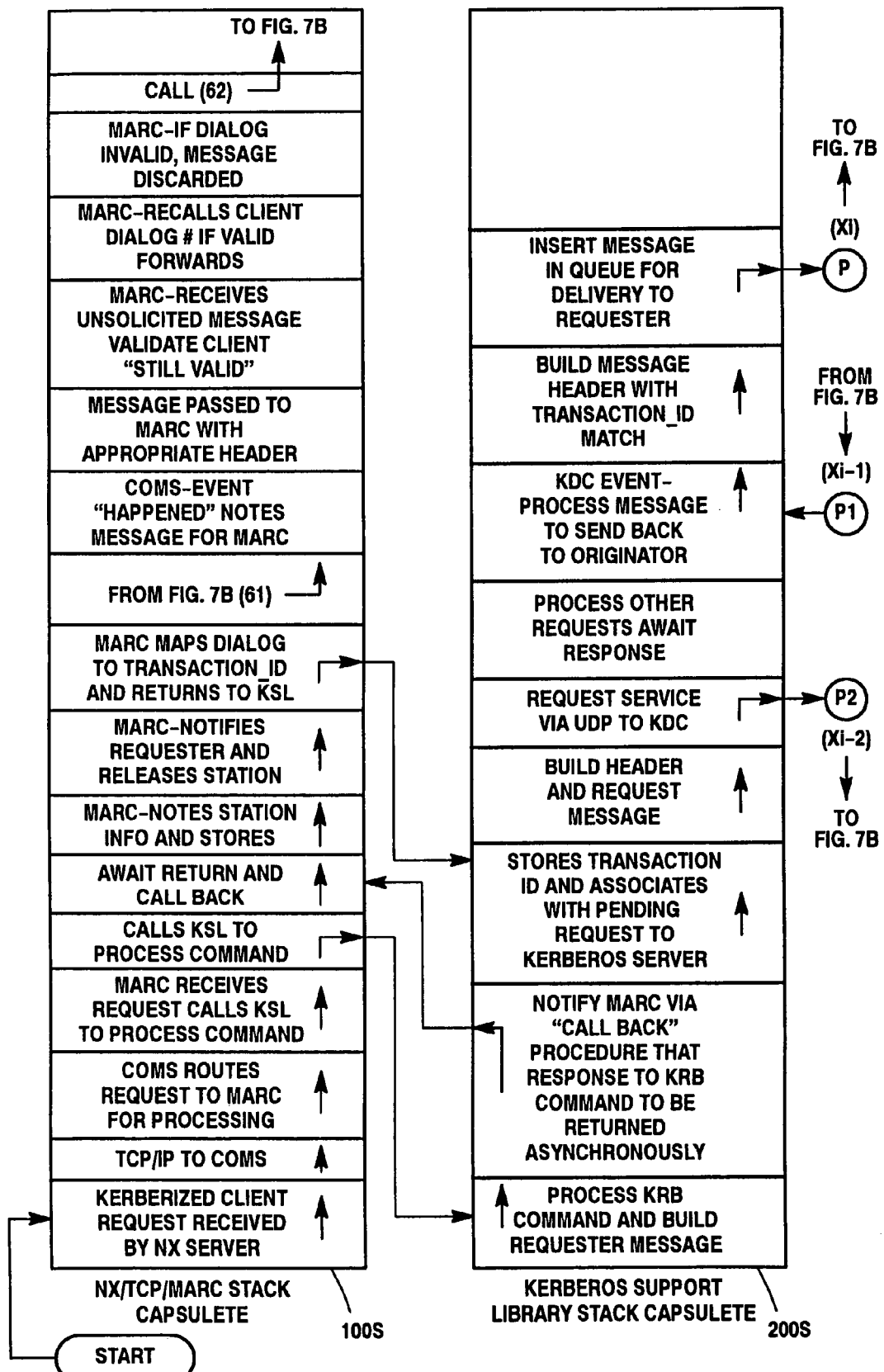
FIG. 7 on sheets 7A and 7B is a drawing illustrating a stack sequence operational chart showing the operations involved in providing a message for delivery to a requester.
Figure 7B:
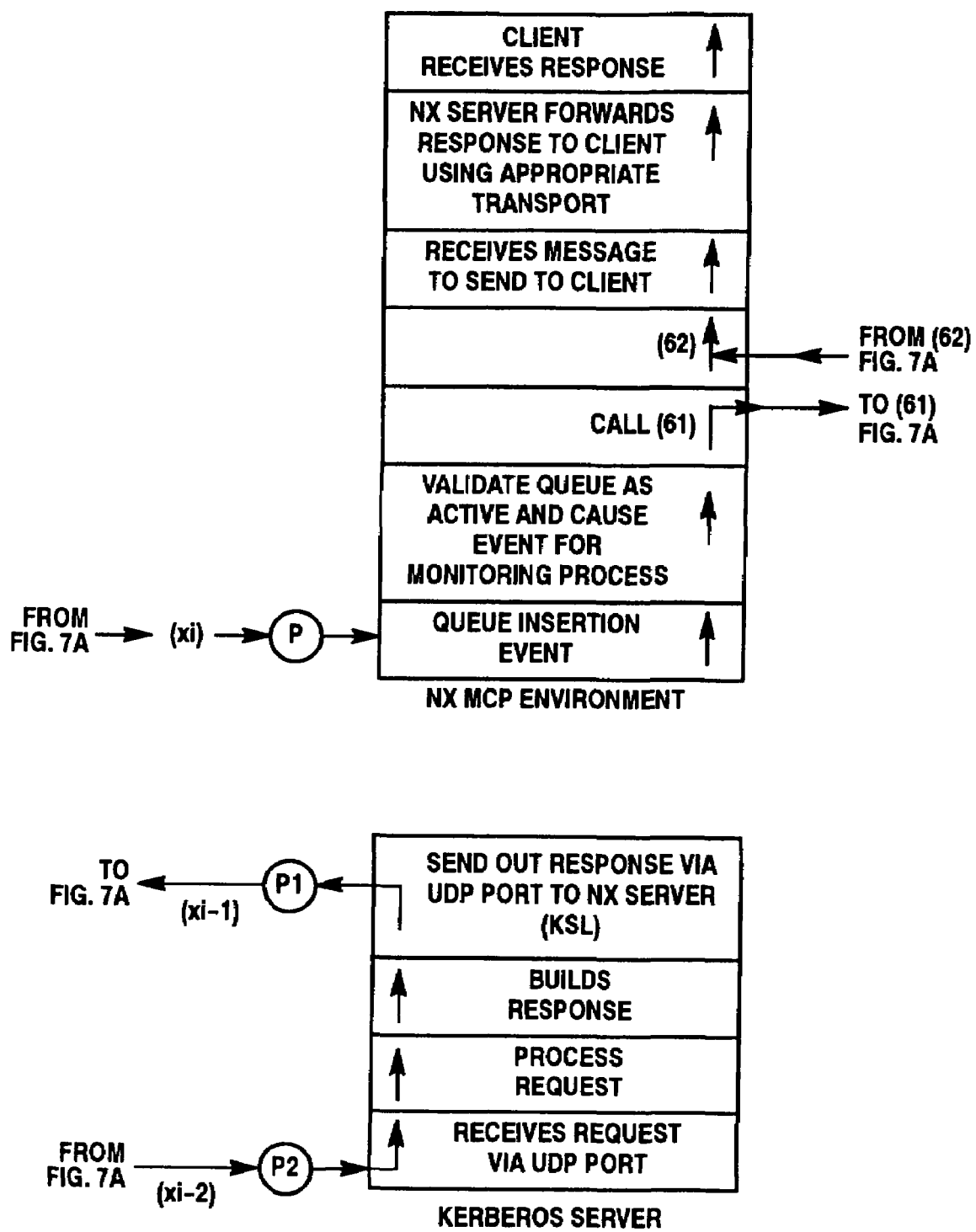

At position (xi) designated "P" of FIG. 6B, it is then necessary to refer to FIG. 7B which shows the Queue Insertion Event (at xi=P). Then, as shown in FIG. 6B at position (xiii), the Kerberos Support Library inserts a formatted message in the queue. The Kerberos Support Library 34 has built the message, that was received from the Kerberos Server, and placed into a queue array, plus attaching in certain control information. The Kerberos Support Library (KSL) then "inserts" this message using an "insert construct" as provided by the DCALGOL programming language. When the "insert statement" is executed, then the MCP code will then be invoked.

Now referring to FIG. 6B, the process "P" continues at position (xi) over to the position (xiii) wherein the Kerberos Support Library inserts a formatted message in the queue (62, FIG. 3) and detailed in FIG. 10. Then, at position (xiv), the master control program (MCP) notes the queue event and passes the information onto COMS. In summary, and as a continuation from position (xi), the MCP code is invoked on top of the queue stack environment (at P of FIG. 7B) which will then process the "insert event statement". This code then takes the array (a structure containing the data or message), which is actually a data descriptor, and in combination, noting the source and the destination, then lays the groundwork to "notify" the destination. The COMS program is the interim destination. The master Control Program "causes" an Event which the COMS environment has been monitoring. When this Event "happens", the CONS program now has visibility to the array (data descriptor), which will then be routed by another queue over to the MARC program, via 61 of FIG. 7B over to 61 of FIG. 7A. Thus it can be said that the MARC program receives the message at position (xvi), FIG. 6B.

This processing function then proceeds to position (xv) FIG. 6B where COMS then notes the queue event and passes the message on to MARC. Then at position (xvi), the MARC process receives the unsolicited message in the control queue FIG. 10. At position (xvi), it is seen that the MARC program receives the unsolicited message in a queue.

An "Unsolicited Message" is a message generated by any software which will be ultimately displayed by another software which is not in a "wait" state (waiting) for said message to be delivered to it. The receiving software is not aware (programatically) that a message is being delivered. Conversely, a "Solicited message" is a message generated by any software for which another software is waiting (the process environment is suspended) and the receiving software is aware that it will be receiving this message.

The process of "receives" is an instance again of moving data from one environment to another environment using a queue. The data descriptor which points to the data in an area of memory is passed from one process to a different process. The MARC program receives the MSG (data descriptor) from COMS, and then MARC will then process this message (xxi) FIG. 6B which will ultimately be passed back to COMS for delivery shown at position (xxii). At position (xxii), it is seen that COMS receives the message to be delivered to the original requester. Here, COMS receives the message from MARC. Then through a series of procedure calls, the message is eventually delivered to the appropriate transport for delivery at the original client-requester 10.

Then, along the communication channel 64 (FIG. 6B) to the position (xvii), here the MARC program processes the unsolicited message and also checks the present validity of the original request.

Thus, at position step (xviii), MARC verifies to see whether the original requester is still a valid requester, after which at position (xix), a check is made at the decision tree to determine whether the particular station is still valid. If the station is valid, Y=Yes, then at position (xx) a "valid return" signal is sent to location step (xvi), where MARC receives the unsolicited message in a control queue, at which time on channel 65, at position step (xxi), MARC converts the encoded station information into a CONS message format. This is sent via position (xxii) whereby CONS receives the message to be delivered to the original requester at the terminal 10.

FIGS. 7A and 7B are a set of drawings showing the stack of processes used in a sequential set of software operations. In FIG. 7A, the left-hand stack designated "100s" is marked as the NX/TCP/MARC stack capsulate. The stack "200s" on the right side of FIG. 7A is designated as the Kerberos Support Library stack capsulete. Sequential interconnections between stacks 100s and 200s are shown.

In FIG. 7B, the process stack designated NX MCP environment is the sequence of processes which originate from the pointer P, location step (xi) coming from FIG. 7A.

The lower portion of FIG. 7B is the processor stack environment for the Kerberos server correlating the pointer P1 location step (xi-1) of FIG. 7A and also the pointer P2 location (xi-2) coming from FIG. 7A.

Referring to FIG. 7A, the stack capsulete 100 starts with the Kerberized client request received by the NX server 13. Then the transmission control protocol/internet protocol provides communication to the CONS software whereinafter the COMS routes the request to MARC for processing Support Library to process the command. Then, a call is made to the Kerberos Support Library to process the command, after which there is a period for awaiting the return and a call-back. The call back process is the KSL informing MARC that this command will be processed asynchronously. In addition KSL requests several attributes (the MCS number and Transaction_ID) such that KSL may return this information for routing purposes to MARC when the final response is returned.

Since MARC can receive Unsolicited Message(s) from other software's like Controller, it is intended to show that the message MARC received is a message from KSL 34. There is a fine distinction between box (xvi) and (xvii) in FIG. 6B; in (xvi) MARC is receiving an unsolicited message from someone. In (xvii) MARC now knows it to be a Kerberos message from KSL 34.

The MARC program notes the station information and stores the information (Stack 100s, FIG. 7A). The MARC program notifies the requester and "releases" the station for other operations.

Now MARC maps the dialogue number to the Transaction_ID and returns the dialogue number to the Kerberos Support Library. This brings the process to FIG. 6A, (61) shown in stack 100s which correlates to FIG. 6A designated (61) between the step (ii) and step (iii).

Note that in stack 100s (FIG. 7A), there were several intermediate steps, such that the step involving "Calls Kerberos Support Library To Process Command", will be seen to communicate to the stack 200s whereupon there is a processing of the Kerberos command and the building of a requester message after which there is a notification to MARC via a "call back" procedure, such that the response to the Kerberos command is to be returned "asynchronously". This is then fed over to the first stack 100s at the block designated "Await Return And Call-Back". Subsequently at stack 100s at the function where MARC maps the dialogue number to the Transaction_ID and returns this data to the Kerberos Server Library, there is then a sequence over to the stack 200s (FIG. 7A) where the system stores the Transaction_ID and associates it with a pending request to the Kerberos server, after which the system builds a header and request message which then involves a request of service via the User Datagram Port (UDP) to the KDC (Key Distribution Center) 22, FIG. 2.

The request for service via the UDP to the KDC in stack 200s is seen at location (xi-2) "P2" FIG. 7A which is further continued on FIG. 7B where the Kerberos server receives the request via the UDP port then processes the request and builds the response, then sends out the response via the UDP port to the NX server 13 which function is continued as "P1" which relates back to FIG. 7A at location (xi-1).

Here, at FIG. 7A, step (xi-1)=P1, there is a KDC event, such that the message is processed to send back to the originator. Then proceeding upward in stack 200S, the Kerberos Support Library will build the message header with a Transaction_ID match after which there will be an insertion of the message in the queue for delivery to the requester at location (xi) "P". Now referring to FIG. 7B, the NX_MCP environment shows the sequence at "P" (xi) which involves a queue insertion event, followed by an action to validate that the queue is active and to cause an "event" for monitoring the process.

Then, a call is made to (61) located on stack 100S (FIG. 7A) followed by the events shown on the upper part of stack 100s, where the COMS-event has "happened" and notes a message for MARC. Then, the message is passed to MARC with the appropriate header, after which MARC receives the unsolicited message. At this time, there is also a validation cycle to validate that the client is still valid. After this, MARC recalls the client dialogue number and if valid, forwards the dialogue number. If the dialogue number is invalid, then MARC will discard the message. This is followed by a call to position (62) of FIG. 7B whereby the client-server 13 is seen to transport the response to the client with a message as—"your password has been successfully changed".

Thus, in summary, the asynchronous service request from MARC designated as "process C" is seen in FIG. 6A so that now referring to FIG. 4, the client service request is being routed to the MARC whereby MARC requests for Kerberos service and the Kerberos Support Library receives the request for service (d1, FIG. 4), will then select the "asynchronous" message choice YES at (e) which will then trigger the process "C", location (f2) which is then instituted at FIG. 6A, together with FIG. 6B.

In FIG. 6A, a series of processes designated (61) operates between the moment that the Kerberos Support Library notifies MARC that an asynchronous service is requested and at the point (iii), FIG. 6A, where the MARC program notes the client's details and releases the session back to the original requester at terminal 10, after which the client is free to initiate a new service request even though the asynchronous service request has not yet been consummated.

However, subsequently, an unsolicited message will be generated by the Kerberos server and the MARC program in order to notify the client via an unsolicited message that he may proceed with his original request, since he has now been authenticated by the Kerberos Server.

Thus, the user-client can initiate a first or original request for service in a Kerberized environment and does not have to wait for a validation and completion of that original request before he can proceed to do other request operations. After receipt of an unsolicited response to this original request, the originating client-User operator can then pursue the original request.

FIGS. 8 and 9 were previously described under the heading of "GENERAL OVERVIEW".

DESCRIPTION OF PREFERRED EMBODIMENT

The present system provides the service of client authentication in a]Kerberos Domain or Realm through use of an asynchronous message process where the clients are authenticated partially by a software process residing in the client-server module. Referring to FIG. 15, there is seen a diagram showing the major operating elements which provide for a client authentication and validation of communications which are funneled through system libraries which provide several software processes. The client-server 13 in FIG. 16 is shown to be connected to the client terminal 10 which communicates commands to the client-server 13 and receives back certain responses. The client server here, designated the "ClearPath NX" server, is provided with the Master Control Program module 60, which interacts with the Menu-Assisted Resource Control Program 40. The Menu-Assisted Resource Control Program 40 (MARC) communicates with the COMS 42 (Communications Management System) which then interacts with the Kerberos Support Library 34. The Kerberos Support Library 34 then communicates with the Generic Security Service—Application Program Interface 38 (GSS-API) for the purpose of accessing security services.

The Encryption Library 32 communicates with the Kerberos Support Library 34 and the Generic Security Service module 38.

The client server 13 (FIG. 16) operates within a Kerberos domain which is provided by the KDC Kerberos Server 20 having a key distribution center KDC 22, and a Kerberos administrator program 24 (K-ADMIN).

FIG. 16 provides an overview of the operating modules which provide client authentication using the asynchronous message module.

As seen in FIG. 16, the ClearPath NX Server 13 has communication lines to the client 10 and also to the Kerberos Server 20. Within the ClearPath Server 13, there is indicated the COMS program 42 which works in communication with MARC 40 and also with the Kerberos Support Library 34. The MARC program 40 communicates with the Master Control Program (MCP) 60 which also has communication lines to the Encryption Library 32. The Kerberos Support Library 34 is connected with communication lines to the general security services application program interface 38.

The Kerberos Server 20 is then seen to have its internal modules involving the Kerberos Administrator 24 and the Key Distribution Center (KDC) 22.

Figure 17:
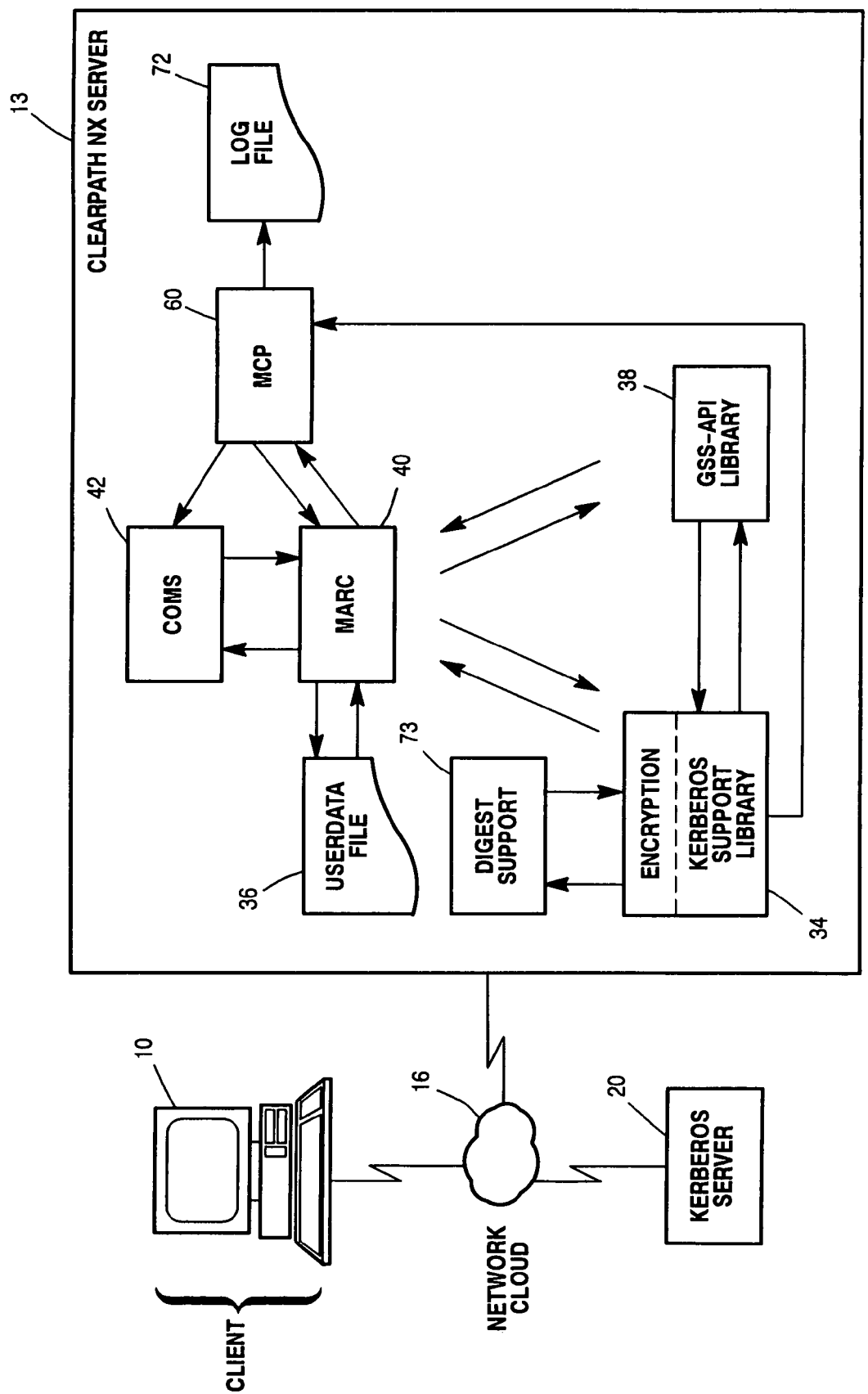
FIG. 17 is a generalized drawing showing an expansion of FIG. 16 by indicating the Digest Support Modules and Log File.

FIG. 17 is a generalized drawing which shows another expanded view of the system whereby the client 10 communicates through a network cloud 16 which connects the client to the Kerberos Server 20 and to the client server unit 13.

Then the client server 13 is seen to have the interconnecting modules indicated whereby the User Data File 36 is connected to the Menu-Assisted Resource Control Program, MARC 40. The MARC 40 is seen connected to the CONS program 42 and additionally has communication lines to the Kerberos Support Library 34 and the GSS-API Library 38. The Kerberos Support Library 34 has connections to a Digest Support unit 73 and also connects to the Master Control Program 60 which coordinates with the COMS program 42 and the MARC program 40, and uses the Log File 72 to store the accumulated data.

Figure 18:
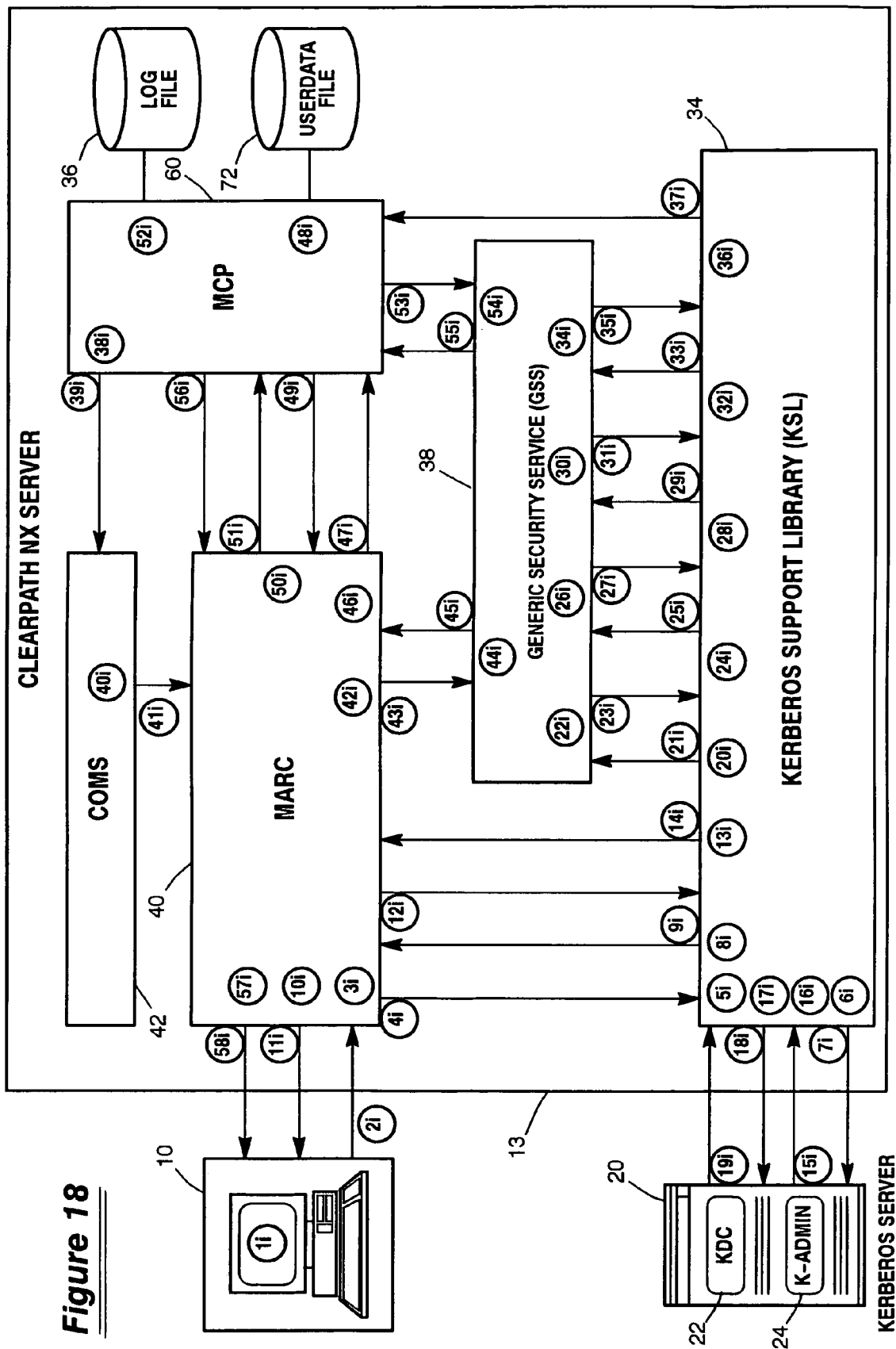
FIG. 18 is a process diagram showing the interacting elements and illustrating the sequence of operations for authenticating a client or principal in a Kerberos domain with an asynchronous message process.

Now referring to FIG. 18, there is indicated a "process diagram" which shows the operative elements involved together with a series of numerical indicators designated 1*i*, 2*i*, 3*i*, . . . up to 58*i*. These "i" numbers provide a sequence of software steps and operations which provides the software mechanism for authenticating a client or principal in the Kerberos domain through utilization of an asynchronous message process when the client has not previously been pre-authenticated.

The major elements seen in FIG. 18 are shown as the client personal computer 10, which is interconnected to the ClearPath NX server 13. Within the ClearPath NX server 13, the operating elements are seen to be the Communications Management system, COMS 42, which communicates with the Menu-Assisted Resource Control Program (MARC) 40. These two modules are controlled and communicate with the Master Control Program 60 (MCP) which has a connection to a Log file 36 and a User Data file 72.

The Master Control Program 60 is seen interconnected to the General Security Services Unit 38 which also interconnects to MARC 40 and to the Kerberos Support Library 34. The Kerberos Support Library 34 (also indicated in FIG. 2) is seen connected to the Kerberos Server 20 which has a Key Distribution Center 22 (KDC). Additionally, the MARC 40 program also interconnects to the Kerberos Support Library 34 (KSL).

Now referring in FIG. 18 to the sequence of software operational steps which are involved in authenticating the client or principal in the Kerberos domain with an asynchronous message process, there is seen a series of sequential numbers designated 1*i*, 2*i*, 3*i*, . . . up to 58*i*, which will be described herein in a sequential set of functional steps.

At step 1*i*, the User Client 10 enters Logon information on the Kerberos Logon screen and initiates the transmit operation. This message is transported by any number of network protocols and is not specific to any Particular protocol. At step 2*i*, the Logon information is transported from the client 10 over to the Menu-Assisted Resource Control Program 40 (MARC).

At step 3*i* at the MARC program, the MARC program 40 performs security checks, for example, in order to verify the password entered in a Protected field, and places a string on the front of the package that will be sent to the KSL 34. The string includes: the text "INIT"; the <Principal ID> and <Password> entered by the user in step 1*i* (e.g., "INIT<Principal ID><Password>." INIT allows a User to logon to the Kerberos Server 20 to obtain credentials as a Ticket Granting Ticket (TGT) and a session key.

At step 4*i*, MARC 40 will send this package over to the Kerberos Support Library 34 (KSL). Here, at step 5*i*, the Kerberos Support Library performs a syntax checking on the package received.

The INIT token as the first of the message, will be followed by two or three additional tokens—a Principal_ID and a password or Principal_Name, which is optionally followed by a Realm Name, and a password. The KSL verifies that the Principal_ID (or Principal_Name and optional Realm Name) obey the standard syntax rules.

At step 6*i*, the Kerberos Support Library, KSL 34, creates a new KSL-credential-structure to hold information pertaining to this particular client (e.g. PID and password). KSL then builds an Authentication request (AS_Req message). The KSL 34 allocates a new KSL-credential-structure from a pool of such structures and stores the Principal-ID in it. The logon data is then converted to the user's secret key which is saved in the structure. KSL 34 then builds a AS_Req message, the format of which is described in RFC 1510, Section 5.4.1. "KRB_KDC_REQ Definition", and stores information relative to the request in an AS-Req-structure, also obtained from a pool of such structures. This information includes the KSL-cred-handle which identifies the KSL-credential-structure and a random number (called the "NONCE") which is also contained in the AS_Req message.

At step 7*i*, the Kerberos Support Library 34 sends the AS_Req message over to the Key Distribution Center 22. The UDP protocol is used to send the message to Port 88 at the IP address indicated for the KDC 22 serving the realm indicated by the entered Principal_ID (if no realm was provided, the configured local realm is assumed).

At step 8*i*, the KSL creates a "processing request" message for the MARC program 40. This message is contained in an "OUTPUT MESSAGE ARRAY" which allows translation of the message to any text in any natural language. The KSL 34 merely calls a standard procedure which copies a message to a buffer ready for passing to MARC 40.

Then at step 9*i*, the KSL passes a "Processing request" message over to MARC 40 via the "Send-Response" callback procedure. Then at step 10*i*, the MARC program 40 will process this processing request message, after which at step 11*i*, MARC sends the message to the client terminal 10.

At step 12*i*, MARC 40 returns control from the call-back procedure back to the Kerberos Support Library 34. Then at step 13*i*, the KSL 34 prepares any return parameters for MARC 40, for example, such as a message containing secured data. The KSL 34 returns the value "14" (indicating the actual success or failure of the authentication process) which will be provided to MARC 40 via a message sent asynchronously using the MCP's DCSENDMESSAGETOMCS procedure.

Then at step 14*i*, the KSL 34 returns control to the MARC 40 together with any return parameters. Only the value of "14" is relevant in this case.

At step 15*i*, the Key Distribution Center 22 (KDC) returns the Authentication Response (AS_Rep message) over to the Kerberos Support Library 34. This can happen anytime after step 7*i*.

The KDC 22 decodes the AS_Request message which the KSL 34 had sent to it and, assuming its database contains appropriate information for the Principal_ID contained in the message, then builds an AS_Rep message. The AS_Rep message contains a Ticket Granting Ticket (TGT) and other information related to the data passed in the AS_Request. Most of this latter information, including the "NONCE", is contained in a token which is encrypted using the Principal's shared secret key. This key can be generated by transforming the data entered on the logon screen and is shared only between the user (who knows the password) and the KDC 22 which holds the corresponding key in its database. The KDC 22 uses the UDP protocol to return the AS_Rep message to the KSL 34.

Now at step 16*i*, the Kerberos Support Library 34 decodes (decrypts) the authorization response and performs various verification checks, for example, like the "Clockskew" check. The KSL 34 receives the AS_Rep message from the KDC 22 and matches it to the original request using the fact that it can successfully decrypt the encrypted token using the Principal's password and that the particularly contained information, especially the "NONCE", matches what was sent in the AS_Request message.

Then at step 17*i*, the KSL 34 builds a Ticket Granting Service request (TGS_Req message) for permission to access the local host service. The KSL 34 creates a TGS_Req message requesting a service ticket for the local host service. This request includes the TGT returned in the earlier AS_Rep message.

At step 18*i*, the Kerberos Support Library 34 then sends the TGS_Req message over to the Key Distribution Center 22. Again, the UDP protocol is used to send the message to port "88" at the IP address indicated for the KDC 22 serving the realm indicated by the entered Principal_ID.

Now at step 19*i*, the KDC 22 returns a Ticket Granting Service response (TGS_Rep message) over to the Kerberos Support Library 34. This can happen anytime after step 18*i*. The KDC 22 decodes the TGS_Req message which the KSL 34 had sent to it and, assuming its database contains appropriate information for the service contained in the message, then builds a TGS_Rep message. The TGS_Rep message contains a service ticket for the requested service. The KDC 22 uses the UDP protocol to return the TGS_Rep message to the KSL 34.

At step 20*i*, the Kerberos Support Library 34 will decode/ or decrypt the TGS response and perform verification checks, such as a Clockskew check. It also creates a new KSL-credential-structure to hold information pertaining to this particular client (for example, PID and the tickets returned by the KDC 22). The KSL 34 also creates parameters to pass over to the Generic Security Service 38 (GSS) in order to get a name handle corresponding to the client's PID (Personal identification Number).

Decoding and decryption of the TGS response occurs in several stages. First, the encrypted part of the message is decrypted using the key which was returned in the earlier AS_Rep message and the resulting plain text is decoded. The fact that this is possible indicates that the message could only have been generated by the KDC 22. The KSL 34 has access to the service key for the local host and uses this to decode and decrypt the Service Ticket in the TGS response. The success of this phase indicates that the original client is allowed access to appropriate facilities on the local host machine. Once all of the checks have been completed, the KSL 34 creates a credential structure which may be used in the future if the client attempts some function which requires the established credentials.

Then at step 21*i*, the Kerberos Support Library 34 will call the GSS 38 and pass the PID, the PID length and its name type. The KSL 34 passes the client's Principal_ID, its length, and the name type to the GSS 38, requesting a name handle which will be used in the future to refer to this name.

Then at step 22*i*, the GSS 38 will process the PID/name type (store PID/name type).

GSS 38 uses the name type to identify the mechanism that made the call. GSS 38 stores the PID and the PID length in its internal heap and a pointer to the name in its tables.

At step 23*i*, the GSS calls the Kerberos Support Library 34, KSL 34, to translate the PID into a local user code (UC) on the system. The PID and the PID length are passed on to the KSL 34.

At step 24*i*, the Kerberos Support Library 34 maps the PID to the User Code (UC) and its length, and prepares the information to return to the GSS 38. KSL 34 uses the system procedure "USERDATA" to map the PID to a corresponding A-Series USERCODE. This USERCODE is converted into the form expected by the GSS 38. The expected form is an upper case identifier in parentheses. For example, the USERCODE "FRED" will be converted to "(FRED)".

At step 25*i*, the Kerberos Support Library 34 returns the User Code/and the length, to the GSS 38. At step 26*i*, the GSS 38 stores the User Code (local name) /length/ in its internal tables and generates a Name-Handle for the name. At step 27*i*, the GSS 38 returns the generated Name-Handle over to the Kerberos Support Library 34. At step 28*i*, the Kerberos Support Library 34 saves the Name-Handle in the KSL-Credential-Structure, and then creates the KSL-Credential-Handle for this particular structure.

At step 29*i*, the Kerberos Support Library 34 calls the GSS 38 (Mech_Add_Cred) passing the Name-Handle and the KSL-cred-handle requesting the GSS 38 to create its credential information for the client.

At step 30*i*, the GSS 38 validates the Name-Handle passed in by KSL 34. If the validation succeeds, a Credential Handle that corresponds to the Name Handle is created in the GSS internal tables. The GSS-cred-tag is a part of the GSS-cred-handle.

Again referring to FIG. 18, at step 31*i*, the GSS 38 will return the GSS-cred-tag to the Kerberos Support Library 34. Then, at step 32*i*, the Kerberos Support Library 34 will save the GSS-cred-tag in the KSL-Credential-Structure. At step 33*i*, the Kerberos Support Library 34 will pass the GSS-cred-tag over to the GSS 38 asking for the GSS-cred-handle. At step 34*i*, the GSS 38 will map the GSS-cred-tag to the GSS-cred-handle. Then at step 35*i*, the GSS 38 returns the GSS-cred-handle back to the Kerberos Support Library 34. At step 36*i*, the Kerberos Support Library 34 builds a message to inform MARC 40 that the Kerberos authentication has successfully completed (the message includes the GSS-cred-handle).

At step 37*i*, the Kerberos Support Library 34 calls the Master Control Program 60 (MCP) (DCSENDMESSAGETOCOMS), thus passing to MARC the message.

At step 38*i*, there is a communication from the MCP 60 over to the COMS program 42 as was described in the U.S. patent application, Ser. No. 09/026,746, now U.S. Pat. No.

6,175,920 entitled "Expedited Message Control for Synchronous Response in a Kerberos Domain", which is incorporated herein by reference.

At step 39i, the Master Control Program 60 (MCP) puts in an "intercomq" request for COMS 42. The response is inserted ultimately by using the INSERT constructed into an intercomq managed by the MCP 60. COMS 42 is notified of such an INSERTion via a queue event mechanism.

Then at step 40i, the communication management system COMS 42 recognizes this queued message as a message for MARC 40 if the message has a mutually agreed upon value in the first word of the Header. At step 41i, COMS 42 then sends a message over to MARC 40 by calling a procedure and passing in a mutually known function code. Thus signals MARC 40 that this message is from Kerberos.

At step 42i, MARC recognizes an asynchronous message from the Kerberos Support Library 34, then verifies it and then extracts the GSS-cred-handle. At step 43i, MARC 40 calls the GSS 38 (ASP-handle_internal_ID) passing the GSS-cred-handle. At Step 44i, the GSS 38 maps the GSS-cred-handle to a user Code (UC). GSS 38 has links that relate the Credential Handle to a Name Handle. The Name Handle has the user code information in the GSS tables.

Then at step 45i, the GSS 38 returns the User Code (UC) over to MARC 40. At step 46i, MARC 40 begins to create a session for the User. At step 47i, MARC 40 then calls the MCP 60 (user data file 72) in order to get the User's attributes. At step 48i, the MCP 60 reads the UserCode attributes from the USERDATAFILE 72. These attributes contain specific information unique for a given client or user. These attributes, however, are not germane to the overall description of this mechanism.

Then at step 49i, the MCP 60 returns the attribute information back to MARC 40. MARC is passed this information as a return to an entry point call.

Then at step 50i, MARC 40 completes the creation of the User's session. At step 51i, then MARC 40 passes the session information and the GSS-cred-handle over to the MCP 60 via the MCS_Logger.

At step 52i, the Master Control Program 60 (MCP) Writes to the Log file 36. Specific information is recorded in the log, none of which is considered "Sensitive" client/user information.

At step 53i, the MCP 60 calls the GSS 38 (MCP_ADD_Credential) passing the GSS-cred-handle and the mix number.

At step 54i, the GSS 38 associates the mix number with the GSS-cred-handle and stores it in its own tables. Then at step 55i, the GSS 38 returns the control back to the MARC 40. At step 56i, the MCP 60 returns the control back to MARC 40. This is a release of a call back to the original requestor.

Then at step 57i, the MARC program 40 generates default home screen for the client User 10. If the client has been authenticated, the client is sent (or presented with) their home or default screen (menu-graph). In the event of a failed attempt, an error message or screen will then be returned.

Then at step 58i, MARC 40 sends the default home screen (or the rejection screen) to the client terminal waiting for input to the screen. Like step 1i, this screen is sent to the client via a non-specific network protocol. The client User now has his response, and knows he is or is not authenticated.

Described herein has been a software mechanism which authenticates a client (previously non-authenticated) or a non-preauthenticated Principal operating in a Kerberos domain or realm through use of an asynchronous message process. The validation of the client's ability to participate is performed by a Kerberos Server. The communications between the client and the server are performed by using various types of messages and various protocols, such as the Communications Management System 42, the Menu-Assisted Resource Control system 40, the Master Control Program 60, the Generic Security Service 38, and the Kerberos Support Library 34, together with the Kerberos Server 20. If the authentication mechanism was only able to process a single request for authentication to completion, there would normally exist a long wait or bottleneck while various other requests were being processed. However, by utilizing an asynchronous mechanism and its subtasks in various states, the authentication can be processed without having to wait for any one single request to be completely finished. Thus, there is provided a facilitation of completed authentication processing of multiple requests from non-preauthenticated multiple clients, each of which have been requesting Kerberos authentication.

While a particular example of the above-mentioned method and system has been described for effectuating a non-preauthenticated Kerberos Logon using an asynchronous message mechanism, other embodiments may also be implemented which still are encompassed by the present invention, which invention is to be understood as being defined by the following claims.

What is claimed is:

1. A system for enabling asynchronous authentication of a non-preauthenticated client-User means in a Kerberos domain servicing multiple requesting non-preauthenticated clients while eliminating any delays due to multiple concurrent authentication requests, said system comprising:
    (a) client-User means (10) for requesting authentication from a specialized multi-processor, multi-platform client-server means (13);
    (b) said specialized multi-processor, multi-platform client-server means (13) for communicating with a Kerberos server means (20) for developing a specific set of credentials for each client requesting authentication;
    (c) said Kerberos server means (20) for developing an asynchronous authentication response and a Ticket Granting Service to said specialized multi-processor, multi-platform client-server means (13).

2. The system of claim 1 wherein said client-User means (10) includes:
    (a1) multiple client-Users who may concurrently seek authorization to utilize said specialized multi-processor, multi-platform client-server means.

3. The system of claim 1 wherein said Kerberos server means (20) includes:
    (c1) means to return an authentication response to said specialized multi-processor, multi-platform client-server means;
    (c2) means to return a Ticket Granting Service signal to said specialized multi-processor, multi-platform client-server means.

4. The system of claim 1 wherein said specialized multi-processor, multi-platform client-server means includes:
    (b1) communication means (MARC40, COMS42) for exchanging information between a requesting principal or client-User, a Master Control Program a General Security Service Library (GSS38), and a Kerberos Support Library (KSL34);
    (b2) said Master Control Program (60) for controlling said communication means, said General Security Service Library and said Kerberos Support Library (34);

(b3) said General Security Service Library (GSS38) providing multiple threads for handling multiple concurrent requests for authentication;

(b4) said Kerberos Support Library (34) for developing and storing specific authentication credentials for each validated client-User authentication request.

5. The system of claim 4 wherein said Kerberos Support Library (34) includes:

(b4a) means for accessing said Kerberos Server means (20) to acquire an authentication response and a Ticket Granting Service.

6. A secure message transmission system in a Kerberos environment which permits a client-user to operate in a network for authentication request transmittal and message response without suspending client service when a Kerberos Server (20) has not yet responded to an earlier request for an authentication message code signal, said system comprising:

(a) client-terminal means (10) to indicate an original request for validation of an authentication message signal from a Kerberos Server (20);

(b) specialized multi-processor, multi-platform server means having program means (MARC 40 and COMS 42), under control of a Master Control Program (MCP60), for transmitting requests for service to a Kerberos Support Library (34), a General Security Service Library (38) and to said Kerberos Server (20) for the return of an authentication response message to said client terminal means (10) from credential information placed in said General Security Service Library of said specialized multi-processor, multi-platform server means;

(c) means for enabling said Kerberos Support Library (34) to elicit authentication information and Ticket Granting Service from said Kerberos Server (20) for deposit as validating credential data in said General security Service Library (38).

7. A method for asynchronous authentication of a non-preauthenticated originating terminal in a Kerberos domain, said authentication occurring without delay due to other concurrent requests for authentication by other terminals such as client-Users and principals, said method comprising the steps of:

(a) originating a request, to a specialized multi-processor, multi-platform client-server, for authentication by a non-preauthenticated terminal and including the step of:

(a1) originating concurrent multiple requests for authentication from multiple client-Users and principals;

(b) processing said originating request and other originating requests concurrently and including the steps of:

(b1) developing a set of identifying credentials for said originating terminal and including the steps of:

(b1a) requesting, via a communication means (MARC 40, COM942), under control of a Master Control Program (MCP60), a Kerberos support Library (34), and a Kerberos Server (20), for credentials and a session key;

(b1b) creating a credential structure by said Kerberos Support Library (34) to identify said originating terminal and provide a Ticket Granting Service;

(b1c) generating, by a General Security Service Library (GSS 38), of A Name-Handle and GSS Credential Tag that identifies the originating terminal to said GSS (38) and to said Kerberos Support Library (34);

(b1d) generating a message, by said Kerberos Support Library (34), to inform said communication means (MARC 40, COMS42) that the Kerberos authentication cycle has been successfully completed;

(b2) asynchronously validating said originating terminal for use of a Kerberos domain;

(c) responding back asynchronously by said specialized multi-processor, multi-platform client-server to authenticate the validity of said original requesting terminal without any delays due to other concurrent requests for authentication which includes the step of:

(c1) utilizing said communication means (MARC 40, COMS42) to transmit an authentication signal from a Kerberos Support Library (34) to said originating terminal.

8. The method Of claim 7 wherein step (b1) includes the steps of:

(11b1a) processing concurrent authentication requests via multi-threaded processing means to develop a specific credential for each originating terminal;

(11b1b) conveying a completed authentication request to said Kerberos Support Library (34) and said communication means (MARC 40, COMS42).

9. In a network wherein multiple client-terminals communicate with a specialized multi-processor, multi-platform client-server means (13), having a Kerberos Support Library (34), and communicating with a communications means (MARC 40, COMS 42), a General Security Service Library (38) and said specialized multi-processor, multi-platform client-server means for accessing response information from a Kerberos server (20), a method for enabling a requesting client-terminal to receive an authentication response message asynchronously from said Kerberos Server (20) comprising the steps of:

(a) initiating an authentication command request by a requesting client-terminal;

(b) utilizing said specialized multi-processor, multi-platform client-server means as a communication management system, under control of a Master Control Program (MCP60), using a communication means having a communication management program (COMS 42) and menu assisted resource control program (MARC 40) to communicate said authentication command request to said Kerberos Server (20) via said Kerberos Support Library (34) and to receive a Kerberos response message for credential processing by said General Security Services Library (38) which is then conveyed by said communication means (40, 42) to said requesting client-terminal.

10. The method of claim 9 which includes the step of:

(c) Terminating the session between said client-terminal (10) and said Kerberos Support Library (34) once the authentication request response has been transmitted from said General Security Library (38), thus allowing said specialized multi-platform, multi-platform client-server means (13) to process other authentication requests.

11. The method of claim 9 wherein step (b) includes the step of:

(b1) initiating an error message by said Kerberos Support Library (34) when a failure in authentication has been recognized;

(b2) requesting, via said error message, that said requesting client-terminal should initiate a logon.

* * * * *